(12) United States Patent
Takashima

(10) Patent No.: US 7,965,922 B2
(45) Date of Patent: Jun. 21, 2011

(54) INFORMATION PROCESSING DEVICE, INFORMATION RECORDING MEDIUM MANUFACTURING DEVICE, INFORMATION RECORDING MEDIUM, METHODS THEREOF, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1239 days.

(21) Appl. No.: 11/511,489

(22) Filed: Aug. 29, 2006

(65) Prior Publication Data
US 2007/0065101 A1    Mar. 22, 2007

Related U.S. Application Data

(60) Provisional application No. 60/724,802, filed on Oct. 11, 2005.

(30) Foreign Application Priority Data

Sep. 16, 2005 (JP) ................................. 2005-270484

(51) Int. Cl.
*H04N 9/80* (2006.01)
(52) U.S. Cl. ....................................... 386/248; 386/253
(58) Field of Classification Search .................. 386/104, 386/46, 109, 111, 112, 124, 125, 248, 253, 386/263, 264, 268
See application file for complete search history.

(56) References Cited

U.S. PATENT DOCUMENTS

| | | | |
|---|---|---|---|
| 7,353,541 B1 * | 4/2008 | Ishibashi et al. | 726/26 |
| 7,647,646 B2 * | 1/2010 | Nakano et al. | 726/29 |
| 2002/0141582 A1 | 10/2002 | Kocher et al. | |

FOREIGN PATENT DOCUMENTS

| | | |
|---|---|---|
| JP | 2002-149061 | 5/2002 |
| JP | 2003-109303 | 4/2003 |
| JP | 2004-532495 | 10/2004 |
| JP | 2005-71037 | 3/2005 |
| WO | WO 02/079906 A2 | 10/2002 |
| WO | WO 2005/008385 A2 | 1/2005 |

\* cited by examiner

*Primary Examiner* — Robert Chevalier
(74) *Attorney, Agent, or Firm* — Oblon, Spivak, McClelland, Maier & Neustadt, L.L.P.

(57) ABSTRACT

An information processing device for executing reproduction processing of content recorded in an information recording medium, includes: a data processing unit for acquiring content codes including a program or application information to be applied to the recording content of the information recording medium, and executing data processing in accordance with the acquired content codes; wherein the data processing unit is configured so as to execute the verification processing of a digital signature which allows tampering verification of the entire content codes included in a content code file storing the content codes, and as the verification result, execute data processing in accordance with the content codes on the condition that validity of the content code file has been confirmed.

32 Claims, 25 Drawing Sheets

FIG. 8

| FixUpEntry() { | BITS | DESCRIPTION |
|---|---|---|
| type_indicator | 2 | TYPE IDENTIFIER [00: NO TRANSFORMATION, 01b: PROCESSING WITH TRANSFORMATION DATA, 10b, 11b: PROCESSING WITH TRANSFORMATION DATA INCLUDING IDENTIFICATION MARK] 00b: NO TRANSFORM, 01b: TRANSFORM, 10b AND 11b: FORENSIC |
| FM_ID_bit_position | 6 | IDENTIFICATION BIT POSITION OF PLAY ID CORRESPONDING TO TRANSFORMATION DATA WITH IDENTIFICATION MARK INDICATE BIT POSITION OF PLAYER ID FOR FORENSIC (MSB IS SECOND BIT OF type_indicator) |
| relative_SPN | 12 | POSITION OF PACKET WHERE TRANSFORMATION DATA IS APPLIED (NUMBER OF PACKETS FROM PMT PACKET) RELATIVE PACKET NUMBER FROM PMT TO TRANSFORMED PACKET |
| byte_position | 8 | POSITION WHERE TRANSFORMATION DATA IS RECORDED IN THE PACKET START BYTE POSITION OF TRANSFORMED DATA IN THE PACKET (MORE THAN 5) |
| overwrite_value | 5×8 | TRANSFORMATION DATA VALUE TO BE OVERWRITTEN |
| relative_SPN_2 | 12 | POSITION OF PACKET WHERE SECOND TRANSFORMATION DATA IS APPLIED (NUMBER OF PACKETS FROM PMT PACKET) RELATIVE PACKED NUMBER FROM PMT TO SECOND TRANSFORMED PACKET |
| byte_position_2 | 8 | POSITION WHERE TRANSFORMATION DATA IS RECORDED IN THE PACKET (CORRESPONDING TO SECOND TRANSFORMATION DATA) START BYTE POSITION OF TRANSFORMED DATA IN THE SECOND PACKET |
| overwrite_value_2 | 5×8 | SECOND TRANSFORMATION DATA SECOND VALUE TO BE OVERWRITTEN |
| } | | |

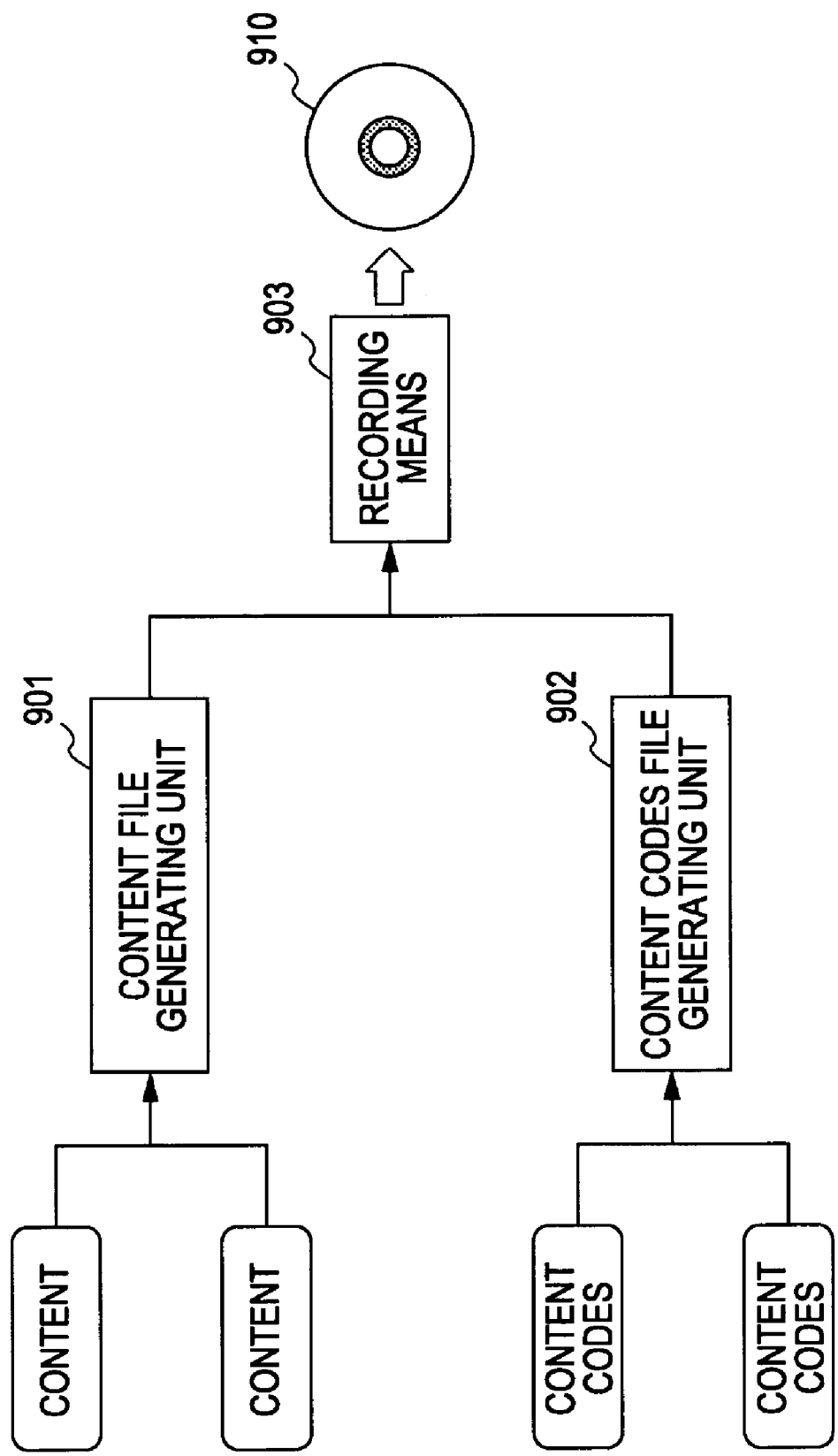

INFORMATION PROCESSING DEVICE, INFORMATION RECORDING MEDIUM MANUFACTURING DEVICE, INFORMATION RECORDING MEDIUM, METHODS THEREOF, AND COMPUTER PROGRAM

CROSS REFERENCES TO RELATED APPLICATIONS

This application claims the benefit to U.S. Provisional Patent Application 60/724,802 filed Oct. 11, 2005.

The present invention contains subject matter related to Japanese Patent Application JP 2005-270484 filed in the Japanese Patent Office on Sep. 16, 2005, the entire contents of which are incorporated herein by reference.

BACKGROUND OF THE INVENTION

1. Field of the Invention

The present invention relates to an information processing device, an information recording medium manufacturing device, an information recording medium, methods thereof, and a computer program. More specifically, the present invention relates to an information processing device, an information recording medium manufacturing device, an information recording medium, and methods thereof, and also a computer program, which realize a strict management arrangement of content codes to be recorded in an information recording medium along with content as a content usage control program.

2. Description of the Related Art

Various types of software data, such as audio data like music and so forth, image data like movies and so forth, game programs, various types of application programs and so forth (hereafter referred to as "content") can be stored as digital data in recording media, for example, Blu-ray discs (Registered Trademark) which employ blue laser, or DVD (Digital Versatile Disc), MD (Mini Disc), and CD (Compact Disc). In particular, Blu-ray discs (Registered Trademark) which employ blue laser are high-density recording-capable disks, and can record massive amounts of picture contents and the like as high-image-quality data.

Digital content is stored in such various types of information recording mediums (recording media) so as to be provided to users. Users reproduce and use the content on a reproduction device such as a PC (Personal Computer), disk player, etc., owned by the user.

Generally, the distribution right and so forth of many contents such as music data, image data, and so forth, is held by the creator or vendor thereof. Accordingly, at the time of distribution of content, an arrangement is normally implemented wherein certain restrictions on usage are laid down, i.e., usage of content is permitted only for authorized users, and unauthorized reproduction and the like is prevented.

With digital recording devices and recording media, recording and reproduction can be repeated without deterioration in image or audio for example, and problems are occurring such as distribution of illegally copied contents over the Internet, distribution of so-called bootleg edition disks of contents copied onto CD-Rs or the like, usage of copied contents stored on hard disks of PCs and the like, in proliferation.

Large-capacity recording media such as DVDs, recording media using blue laser which have been developed in recent years, and so forth, are capable of recording great amounts of data, e.g., one to several movies, as digital information on a single disk. The ability to record picture information and the like as digital information makes preventing unauthorized copies to protect copyright holders an even more important issue. Various techniques have been implemented as of recent for preventing unauthorized copying to digital recording devices and recording media, in order to prevent such unauthorized copying of digital data.

SUMMARY OF THE INVENTION

One technique to prevent unauthorized copying of content and protect the copyright holder is encryption processing of the content. However, even with encrypted content, there is the problem that if the secret key is leaked, unauthorized decrypted content leaks out. The arrangement described in WO2005/008385 is a related art wherein an arrangement is disclosed of solving such problems. WO2005/008385 discloses an arrangement wherein unauthorized reproduction of content is prevented by rewriting a part of the content with dummy data.

At the time of reproduction processing of content wherein content has been replaced with dummy data, processing for replacing the dummy data with the original content data again is necessary. This data transformation processing must be performed without external leakage of the original content, and also, it is preferable that leakage of processing information such as the position of the dummy data and the transformation method is prevented.

Thus, it is necessary at the time of reproduction of content to execute decoding processing or data transformation processing of the content, and also in some cases, execute validity confirmation processing or the like such as regarding whether or not an information processing device or reproduction (player) program for attempting to use the content is an device or program which has received a legitimate license. Such data processing is performed by executing the content codes recorded in an information recording medium along with content as a content usage control program. Note that description has been made in WO2005/008385 regarding an example of content utilization processing using content codes, for example.

Content code is set as a file independent from content, and is recorded in an information recording medium. Accordingly, it is possible to perform processing for moving content code alone to another information recording medium, or processing for copying the content code alone. Upon leakage of content code occurring, circulating in an unauthorized manner, and unauthorized usage being performed, there is the possibility that many contents will be reproduced in an unauthorized manner and used, resulting in serious damage.

The present invention has been made in light of such a situation, and it has been found to be desirable to provide an information processing device, an information recording medium manufacturing device, an information recording medium, and a method, and also a computer program, for realizing a strict management configuration of content codes to be recorded in an information recording medium along with content as a control program for content use. Further, it has been found to be desirable to reduce burden at the time of authoring of a recording medium by facilitating recycling of content codes which can be used in multiple contents, even with content code created for a specific reproduction device, or with same content codes recorded in a medium in which multiple different contents are recorded, for example.

According to one embodiment of the present invention, an information processing device for executing reproduction processing of content recorded in an information recording medium, includes: a data processing unit for acquiring content codes including a program or application information to be applied to the recording content of the information recording medium, and executing data processing in accordance with the acquired content codes; wherein the data processing unit is configured so as to execute the verification processing of a digital signature which allows tampering verification of the entire content codes included in a content code file storing the content codes, and as the verification result, execute data processing in accordance with the content codes on the condition that validity of the content code file has been confirmed.

Further, the data processing unit may be configured so as to execute verification processing of a digital signature provided by a control center, as a verification processing of the digital signature, and further, to execute verification processing of a digital signature signed with a secret key unique to the player manufacturer and thus provided.

Further, the data processing unit may be configured so as to execute signature verification processing regarding each content code file to be used which is selected from multiple content code files recorded in an information recording medium based on the digital signature set in each file.

Further, the data processing unit may be configured so as to execute signature verification processing based on the digital signature set in one content code file, of the content code files to be used which are selected from multiple content code files recorded in an information recording medium, and execute verification processing other than the digital signature verification regarding the other content code files to be used.

Further, the data processing unit may be configured so as to execute verification processing based on a hash value regarding the other content code files to be used.

Further, the data processing unit may be configured so as to execute data processing which becomes necessary along with the replacement processing of some data of content to which a fix-up table included in the content codes is applied.

Further, data processing unit may be configured so as to execute processing for calculating a parameter to be applied to restoring of a fix-up entry included in the fix-up table, serving as a parameter differing for each segment which is set as a sectioned region of the content recorded in an information recording medium.

Further, according to another embodiment of the present invention, an information recording medium manufacturing device includes: content file generating means for generating a content file which stores content data to be recorded in an information recording medium; content code file generating means for storing content codes including a program or application information to be applied for content use, and further generating a content code file including data for tampering verification; and recording means for recording the content file generated by said content file generating means, and the content code file generated by the content code file generating means in an information recording medium.

Further, the data for tampering verification may be a digital signature based on data including the content codes included in the content code file.

Further, the data for tampering verification may be a hash value based on data including the content codes included in the content code file.

Further, the content code file generating means may be configured so as to execute processing for generating multiple content code files storing content codes which are sectioned into multiple different categories, the recording means being configured so as to execute processing for recording the content code file having multiple different categories which are generated by the content code file generating means in an information recording medium.

Further, the content code file generating means may be configured so as to generate multiple content code files storing content codes which are sectioned into multiple different categories, and execute processing for generating only one file, of the generated files, as a content code file including digital signature data.

Further, the content code file generating means may be configured so as to generate multiple content code files storing content codes which are sectioned into multiple different categories, and execute processing for generating each content code file as a file including the digital signature of a producer or presentation entity of content codes included in each file.

Further, according to another embodiment of the present invention, an information recording medium includes as storage data: a content file which stores content data; and a content code file for storing content codes including a program or application information to be applied for content use, and further including data for tampering verification.

Further, the content code file may be a file wherein a code unique to a player that has been signed using the secret key of a player manufacturer, is further signed by the control center.

Further, the data for tampering verification may be a digital signature based on data including the content codes included in the content code file.

Further, the data for tampering verification may be a hash value based on data including the content codes included in the content code file.

Further, the content code file may include multiple content code files storing content codes which are sectioned into multiple different categories.

Further, the content code file may include multiple content code files storing content codes which are sectioned into multiple different categories, and of the files, only one file is a content code file including digital signature data.

Further, the content code file may include multiple content code files storing content codes which are sectioned into multiple different categories, and each content code file is configured so as to include the digital signature of a producer or presentation entity of content codes included in each file.

Further, with another embodiment of the present invention, an information processing method for executing reproduction processing of content recorded in an information recording medium includes the steps of: verification processing serving as a verification step of a digital signature which is set in a content code file storing content codes including a program or application information to be applied for use of recording content of an information recording medium, for executing verification processing of a digital signature which enables tampering verification of the entire content codes included in the content code file; and code executing for executing data processing in accordance with the content codes, on the condition that validity of the content code file has been confirmed as the verification result of the content codes.

Further, the verification processing may be a step for executing signature verification processing regarding each content code file to be used which is selected from multiple content code files recorded in an information recording medium based on the digital signature set in each file.

Further, the verification processing may be a step for executing signature verification processing based on the digital signature set in one content code file, of the content code files to be used which are selected from multiple content code files recorded in an information recording medium, and executing verification processing other than the digital signature verification regarding the other content code files to be used.

Further, the verification processing may be a step for executing verification processing based on a hash value regarding the other content code files to be used.

Further, the code executing may be a step for executing data processing which becomes necessary along with the replacement processing of some data of content to which a fix-up table included in the content codes is applied.

Further, the code executing may be a step for executing processing for calculating a parameter to be applied to restoring of a fix-up entry included in the fix-up table, serving as a parameter differing for each segment which is set as a sectioned region of the content recorded in an information recording medium.

Further, according to another embodiment of the present invention, an information recording medium manufacturing method includes the steps of: content file generating for generating a content file which stores content data to be recorded in an information recording medium; content code file generating for storing content codes including a program or application information to be applied for content use, and further generating a content code file including data for tampering verification; and recording for recording the content file generated in the content file generating, and the content code file generated in the content code file generating in an information recording medium.

Further, the data for tampering verification may be a digital signature based on data including the content codes included in the content code file.

Further, the data for tampering verification may be a hash value based on data including the content codes included in the content code file.

Further, the content code file generating may be a step for executing processing for generating multiple content code files storing content codes which are sectioned into multiple different categories, and the recording be a step for executing processing for recording the content code file having multiple different categories which are generated in the content code file generating in an information recording medium.

Further, the content code file generating may be a step for generating multiple content code files storing content codes which are sectioned into multiple different categories, and executing processing for generating only one file, of the generated files, as a content code file including digital signature data.

Further, the content code file generating may be a step for generating multiple content code files storing content codes which are sectioned into multiple different categories, and executing processing for generating each content code file as a file including the digital signature of a producer or presentation entity of content codes included in each file.

Further, according to another embodiment of the present invention, a computer program which causes an information processing device to execute reproduction processing of content recorded in an information recording medium includes the steps of: a verification processing serving as a verification step of a digital signature which is set in a content code file storing content codes including a program or application information to be applied for use of recording content of an information recording medium, for executing verification processing of a digital signature which enables tampering verification of the entire content codes included in the content code file; and code executing for executing data processing in accordance with the content codes, on the condition that validity of the content code file has been confirmed as the verification result of the content codes.

Further, according to another embodiment of the present invention, an information recording medium manufacturing device comprises: a content file generating unit for generating a content file which stores content data to be recorded in an information recording medium; a content code file generating unit for storing content codes including a program or application information to be applied for content use, and further generating a content code file including data for tampering verification; and a recording unit for recording the content file generated by the content file generating unit, and the content code file generated by the content code file generating unit in an information recording medium.

Note that the computer program according to the present invention is, for example, a computer program capable of providing a computer system capable of executing various types of program codes, through storage media or communication media capable of providing in a computer-readable format, e.g., recording mediums such as CDs, FDs, MOs, and so forth, or communication mediums such as a network or the like. Providing such a program in a computer-readable format realizes processing corresponding to the program on the computer system.

Other objects, features, and advantages of the present invention will become apparent from further detailed description by way of later-described embodiments of the present invention and attached drawings. Note that the term "system" as used in the present specification refers to a logical assembly arrangement of multiple devices, and is not restricted to an arrangement wherein all of the component devices are in the same housing.

According to the configuration of an example of the present invention, an arrangement is made wherein when executing reproduction processing of content recorded in an information recording medium, content codes including a program or application information to be applied for content use are acquired, and verification processing of the digital signature set in the content code file storing the content codes is executed at the stage prior to executing data processing in accordance with the acquired content codes, and as the verification result, data processing is executed in accordance with the content codes on the condition that validity of the content code file has been confirmed, whereby unauthorized execution of content codes can be prevented, and also unauthorized reproduction and use of contents due to unauthorized usage of content codes can be prevented.

Also, according to a configuration of an example of the present invention, an arrangement is made wherein even in the event of setting multiple content code files which are recorded in an information recording medium, and used in an information processing device, a digital signature is set in at least one file, which allows content codes to be used on the condition of realization of verification using the digital signature, thereby realizing strict control regarding use of content codes.

BRIEF DESCRIPTION OF THE DRAWINGS

FIG. 8 is a diagram illustrating the data configuration of fix-up entries included in a fix-up table;

FIG. 25 is a block diagram describing the configuration of the information recording manufacturing device.

DESCRIPTION OF THE PREFERRED EMBODIMENTS

The information processing device, information recording medium manufacturing device, information recording medium, methods thereof, and computer program, according to the present invention, will be described in detail with reference to the drawings. Note that the description will be made according to the following items.

1. Overview of stored data in an information recording medium, and processing at a drive and a host 2. About the content managing unit (CPS unit)

3. Stored-data management configuration of an information recording medium

Figure 1:
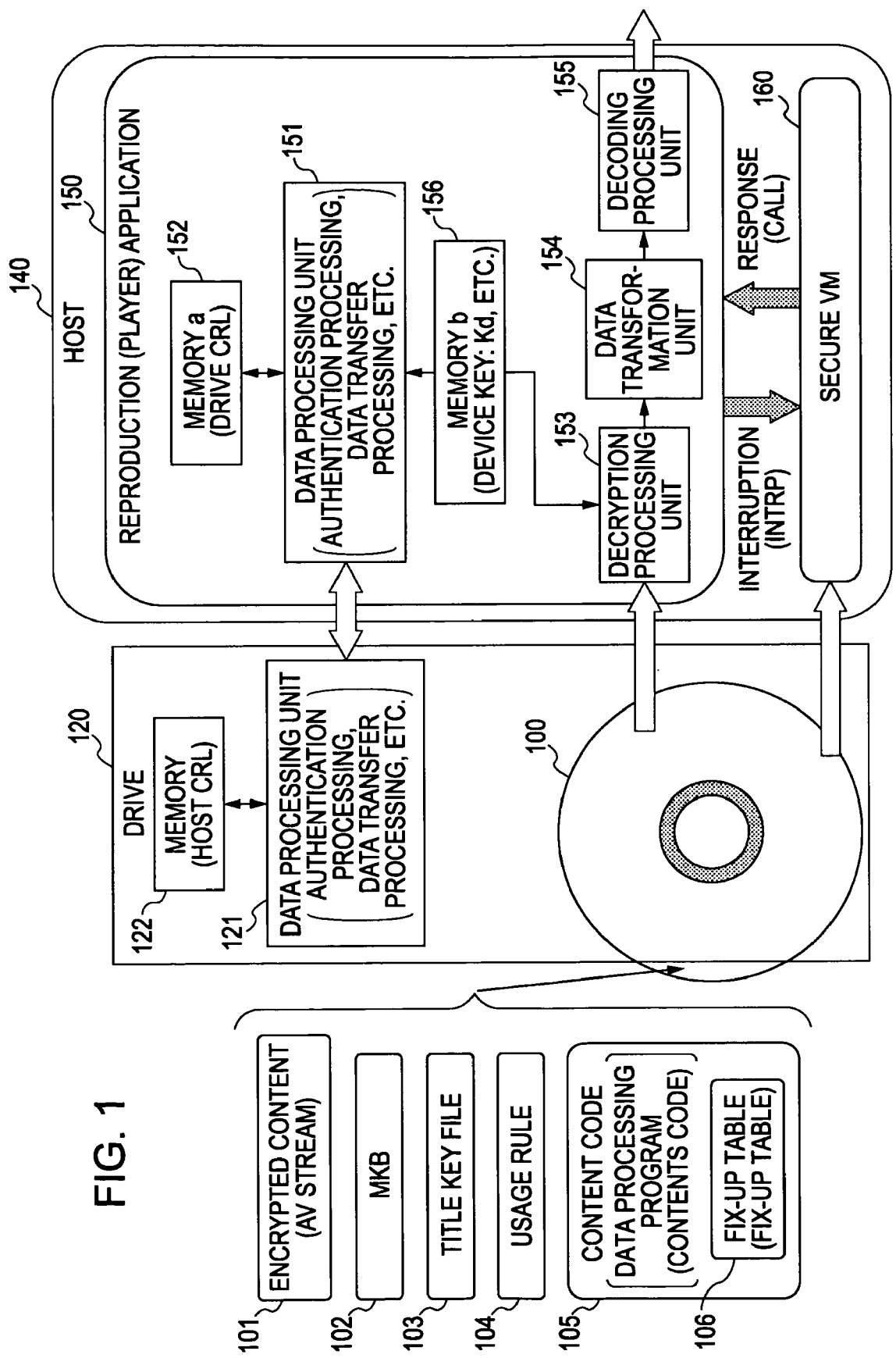
FIG. 1 is a diagram describing the configuration and processing of stored data in an information recording medium, and a drive device and information processing device.

4. Overview of data configuration of content including modified data, and data transformation processing 5. Processing of a reproduction (player) application and the secure VM 6. Content reproduction processing 7. Content code management configuration 8. Configuration of the information processing device 9. The information recording medium manufacturing device and an information recording medium 1. Overview of Stored Data in an Information Recording Medium, and Processing at a Drive and a Host First, description will be made regarding the overview of stored data in an information recording medium, and processing at a drive and a host. FIG. 1 illustrates the configuration of an information recording medium 100 with content stored therein, a drive 120, and a host 140. The host 140 is a data reproduction (or recording) application which is executed on an information processing device such as a PC or the like, for example, and performs processing using the hardware of the information processing device such as a PC or the like, following a predetermined data processing sequence.

The information recording medium 100 is an information recording medium such as, for example, a Blu-ray disc®, DVD, or the like, and is an information recording medium storing authorized content (ROM disc or the like), manufactured at the disc manufacturing plant under the permission of the so-called content right holder, having proper content rights or distribution rights, or an information recording medium capable of recording data (RE disk or the like). Note that with the following embodiment, a disk-type medium will be used as an example for describing the information recording medium, the present invention is capable of being applied to configurations using various types of information recording media.

As shown in FIG. 1, the information recording medium 100 stores a corrected content 101 which has been subjected to encryption processing and partial replacement of data, MKB (Medium Key Block) 102 which is the encryption key block generated based on a tree structure key distribution method known as a type of broadcast encryption method, title key file 103 configured of data wherein a title key to be applied for content decryption processing is encrypted (Encrypted CPS Unit Key) and so forth, usage rule 104 including CCI (Copy Control Information) and the like serving as copying/reproduction control information of content, and content codes 105 including data processing program to be executed at the time of using the encrypted content 101.

The content codes 105 include a fix-up table 106 in which transformation data corresponding to the replacement data of a predetermined region within content has been registered. The information processing device, which executes reproduction of content, extracts the transformation data recorded in the fix-up table 106 included in the content codes 105 in accordance with the data transformation processing program included in the content codes 105, and performs replacement processing of the configuration data of the content.

Content codes include information or a program for executing various types of processing such as startup processing, security check processing, or the like as well as a transformation processing program to which transformation data is applied. A subsequent stage will explain the detail of content codes in detail. Note that the information recording medium storing data example shown in the diagram is but an example, and the stored data differs more or less depending on the type of disk. The overview of each of these types of information will be described.

(1) Encrypted Contents 101

Various types of contents are stored in the information recording medium 100. Examples of the contents include AV (Audio Visual) streams of moving picture contents such as HD (High-Definition) movie content which is high-definition moving picture data, game programs of a format stipulated under a particular standard, image files, audio data, text data, and so forth. These contents are data stipulated under a particular AV format, and are stored according to the particular AV data format. Specifically, this is stored according to the Blu-ray disc® ROM standard format, as Blu-ray disc® ROM standard data, for example.

Further, there are cases wherein game programs, image files, audio data, text data, and so forth, are stored in service data, for example. There are cases wherein these contents are stored as data having a data format not following the particular AV data format.

Types of contents include various contents such as music data, moving picture, still images, and like image data, as well as game programs, Web contents, and so forth, and information of various forms is included in these contents, such as content information usable only by the data from the information recording medium 100, content information usable by combining data from the information recording medium 100 and data provided from the server connected to a network, and so forth. Contents stored in the information recording medium are stored encrypted, with a different key appropriated for each section content (CPS unit key or unit key (or also may be called a title key)), to realize different usage control for each section content. Each unit to which one unit key is appropriated is called a content managing unit (CPS unit). Further, the configuration data of the content is set as broken data wherein a part thereof that is replaced with data different from the correct content data, so decryption processing alone does not reproduce the correct content, and processing for replacing the broken data with data registered in a fix-up table is necessary to perform reproduction. This processing will be described later in detail.

(2) MKB

The MKB (media key block) 102 is an encryption key block generated based on a tree structure key distribution method known as a type of broadcast encryption method. The MKB 102 is a key information block enabling acquiring of a media key [Km] necessary for decrypting contents, only for processing (decryption) based on a device key [Kd] stored on the information processing device of the user having a valid license. This is an application and then information distribution method following a so-called hierarchical tree structure, enabling the acquiring of the media key [Km] only in the event that the user device (information processing device) has a valid license, and user devices which are invalidated (revoking processing) are incapable of acquiring a media key [Km].

An administration center serving as a license entity can generate an MKB having a structure which cannot be decrypted with the device key stored in a certain user device, i.e., wherein the media key necessary for content decryption cannot be acquired, by changing the device key used for decryption of key information stored in the MKB. Accordingly, unauthorized devices can be revoked at an arbitrary timing, thereby providing encrypted contents capable of decryption only to devices having valid licenses. Content decryption processing will be described later.

(3) Title Key File

As described above, each content or group of multiple contents are subjected to encryption applying individual encryption keys for each (title key (CPS unit key)) for managing usage of contents, and stored in the information recording medium 100. That is to say, AV (audio visual) streams, music data, moving pictures, still images, and like image data, game programs, Web content, and so forth, making up the contents, need to be sectioned into units of management of contents usage, with a different title key generated for each section unit, thereby carrying out decryption processing. Information for generating these title keys is title key data, and a title key is obtained by decrypting an encrypted title key with a key generated by a media key or the like, for example. Title keys corresponding to each unit are generated following a predetermined encryption key generating sequence using title key data, and decryption of contents is carried out.

(4) Usage Rule

Usage rule includes, for example, copy/reproduction control information (CCI). This is copy restriction information and reproduction restriction information for usage control corresponding to the encrypted contents 101 stored in the information recording medium 100. There are various settings for the copy/reproduction control information (CCI), such as cases as information for individual CPS units set as content managing units, cases for being set corresponding to multiple CPS units, and so forth.

(5) Content Codes

The content codes 105 are data including a data processing program to be executed at the time of the encrypted content 101 being used. The host, which executes content reproduction, sets a virtual machine (VM) for executing the data transformation processing, executes the data transformation processing in accordance with the content codes read out of the information recording medium 100 at the virtual machine (VM), applies a registration entry in the fix-up table 106, and executes the data transformation processing of the partial configuration data of the content.

The encrypted content 101 stored in the information recording medium 100 has been subjected to predetermined encryption, and also, a part of the contents configuration data is configured of broken data which is different from the proper data. In order to reproduce the content, data overwriting processing is necessary, wherein the broken data is replaced with the transformation data which is the proper content data. The table in which the transformation data is registered is a fix-up table 106. A great number of broken data is set scattered throughout the content, and at the time of reproducing the content, processing is necessary for replacing (overwriting) the multiple pieces of broken data with the transformation data registered in the fix-up table. Applying this transformation data means that even in the event that unauthorized content decryption is performed due to an encryption key leaking, for example, reproduction of proper content is impossible by content decryption alone, due to the presence of the replaced data, thereby enabling unauthorized contact usage to be prevented.

In addition to normal transformation data, the fix-up table 106 includes transformation data enabling analyzing data identification information configuration bits for identifying the contents reproducing device or content reducing application. Specifically, for example, this includes a player ID which is identification data of a player (a device for executing a host application), or "transformation data including identification marks" wherein is recorded identification information generated based on the player ID. Transformation data including the identification marks is data wherein the bid values of the proper content data has been slightly changed, at the level which does not affect the reproduction of content.

Note that the content codes 105 include information or a program for executing various types of processing such as startup processing, security check processing, or the like as well as the data transformation processing program to which the above fix-up table 106 is applied. A subsequent stage will explain the detail of content codes in detail.

Next, the configuration of the host 140 and drive 120, and overview of processing, will be described with reference to FIG. 1. Reproduction processing of the content stored in the information recording medium 100 is executed upon data being transferred to the host 140 via the drive 120.

The host 140 has a reproduction (player) application 150 and a secure VM 160 set. The reproduction (player) application 150 is a content reproduction processing unit, and executes processing such as authentication processing carried out with the drive at the time of content reproduction processing, content decryption, decoding processing, and so forth. The secure VM 160 functions as a parameter generating unit for providing parameters to be applied to the data transformation processing carried out in the content reproduction processing executed by the reproduction (player) application 150 which is the content reproduction processing unit, for example, the secure VM 160 is set as the virtual machine within the host 140. The virtual machine (VM) is a virtual computer which directly interprets and executes an intermediate language, and reads out, interprets, and executes, command code information in an intermediate language not dependent on a platform, from the information recording medium 100.

The secure VM 160 serves as a data processing unit which acquires the content codes 105 including a program or application information to be applied to use of the encrypted content 101 recorded in the information recording medium 100, executes the codes in accordance with the acquired content codes 105, and performs data processing.

Transfer of information or processing requests between the reproduction (player) application 150 and the secure VM 160 is carried out by sequences of interruption (INTRP) from the reproduction (player) application 150 to the secure VM 160, and a response (Call) processing from the secure VM 160 to the reproduction (player) application 150. The sequences of interruption (INTRP) from the application 150 to the secure VM 160, and response (Call) processing from the secure VM 160 to the reproduction (player) application 150 perform parameter calculating requests and providing of parameters applied to the data transformation processing executed in the content reproduction processing. These processing sequences will be described in detail later.

The primary processing which the host 140 executes will be described. Before usage of the content, mutual authentication processing is executed between the drive 120 and host 140, and following confirmation of the validity of both parties by this authentication processing being established, encrypted content is transferred from the drive to the host, content decryption processing is performed at the host side, and further, the above-described data transformation processing by the fix-up table is executed, whereby content reproduction is performed.

For the mutual authentication executed between the host 140 and the drive 120, processing for determining the validity is executed by referencing a revocation (invalidation) list issued by an Administration Center whether or not each of the devices or applications are registered as an unauthorized device or application.

The drive 120 has memory 122 for storing a host CRL (Certificate Revocation List) storing revocation (invalidation) information of the host certificate (public key certificate). On the other hand, the host 140 has memory 152 for storing a drive CRL (Certificate Revocation List) storing revocation (invalidation) information of the drive certificate (public key certificate). The memory is nonvolatile memory (NVRAM), and in the event that the CRL read out from the information recording medium 100 is a newer version, for example, their respective data processing units 121 and 151 performer updating processing for storing the host CRL or the drive CRL of the new version in the memory 122 and 152.

A CRL, such as the host CRL or drive CRL, is constantly updated by the administration center. That is to say, in the event that an unauthorized device has been newly discovered, an updated CRL wherein the certificate ID issued to the unauthorized device or the device ID or the like is added as a new entry, is issued. Each CRL is provided with the version number, and has a configuration wherein the newness can be compared. For example, in the event that a CRL read out from an information recording medium mounted to the drive is newer than the CRL stored in the memory 122 within the drive, the drive performs CRL updating processing. The host 140 also performs drive CRL updating in the same way.

Besides this CRL updating processing, the data processing unit 121 of the drive 120 performs authentication processing with a host that is executed at the time of using content, and further performs processing for reading data from the information recording medium and transferring the data to the host.

The reproduction (player) application 150 of the host 140 is a data reproduction (or recording) application executed on an information processing device such as the PC for example, and performs processing using the hardware of the information processing device such as a PC or the like, following a predetermined data processing sequence.

The host 140 has a data processing unit 151 for performing mutual authentication processing with the drive 120, data transfer control, and so forth, a decryption processing unit 153 for performing decryption processing of encrypted content, a data transformation processing unit 154 for performing data transformation processing based on registered data in the aforementioned fix-up table 105 and a decoding processing unit 155 for performing decoding (e.g., MPEG decoding) processing.

The data processing unit 151 executes authentication processing between the host and drive, and within the authentication processing, references the drive CRL stored in memory a 152 which is nonvolatile memory (MVRAM), to confirm that the drive is not a drive which has been revoked. The host also performs updating processing to store the drive CRL of a new version in the memory a 152.

The decryption processing unit 153 generates the key to be applied to content decryption, using various types of information stored in the memory b156 and data read from the information recording medium 100, executing decryption processing of the encrypted content 101. The data transformation processing unit 154 performs replacement processing (overwriting) of contents configuration data applying the transformation data registered in the fix-up table obtained from the information recording medium 100, following the data transformation processing program obtained from the information recording medium 100. The decoding processing unit 155 performs decoding (e.g., MPEG decoding) processing.

The memory b156 of the information processing device 150 stores a device key: Kd, key information to be applied to mutual authentication processing, key information to be applied to decryption, and so forth. Details of content decryption processing will be described later. The device key: Kd is a key to be applied to the above-described MKB processing. MKB is a key information block which enables obtaining of a media key [Km], which is a key necessary for deciphering content, to be obtainable only by processing (decrypting) based on a device key [Kd] stored in the information processing device of the user which has a valid license, and at the time of decrypting encrypted content, the information processing device 150 applies the device key: Kd stored in the memory b156 to execute the MKB processing. Details of content decryption processing will be described later.

2. About the Content Managing Unit (CPS Unit)

As described above, the content stored in the information recording medium is subjected to decryption processing and is stored with different keys appropriated for each unit, in order to realize different usage control for each unit. That is to say, the content is sectioned into content managing unit (CPS units), individual decryption processing is performed, and individual usage management is made.

At the time of using contents, first, there is the need to obtain a CPS unit Key (also called a title key) appropriated to each unit, and further, reproduction is performed by executing data processing based on decryption processing sequences determined beforehand, applying other necessary keys, key generating information, and so forth. The settings of a content management unit (CPS unit) will be described with reference to FIG. 2.

Figure 2:
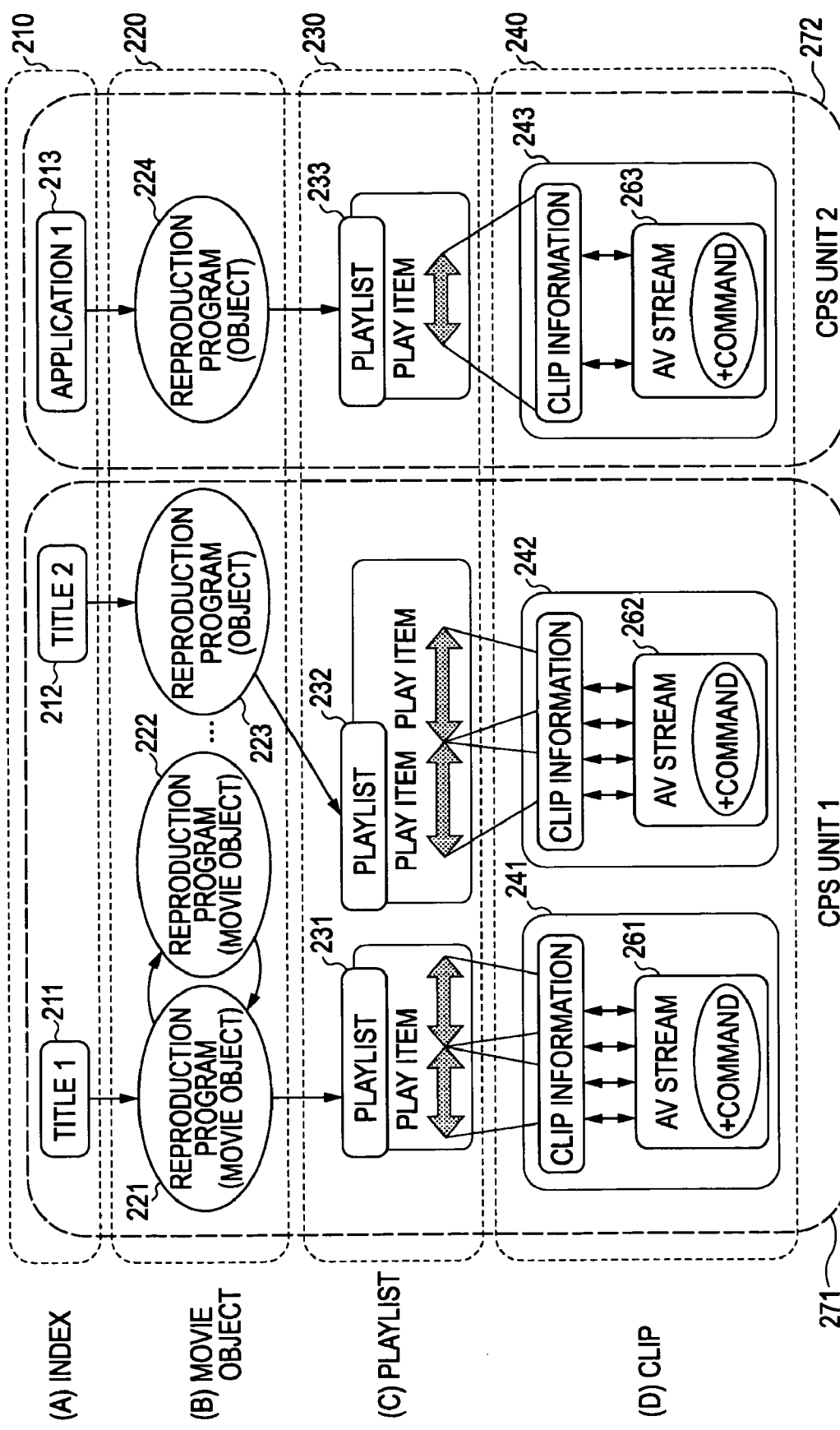
FIG. 2 is a diagram describing a setting example of a content managing unit for settings made regarding stored data in the information recording medium.

As shown in FIG. 2, the content has a hierarchical configuration of (A) index 210, (B) movie object 220, (C) playlist 230, and (D) clip 240. Specifying an index such as a title to be accessed by the reproduction application specifies a reproduction program correlated with the title, for example, and the play list stipulating the order of reproducing the content is selected according to the program information of the reproduction program that has been specified.

Play items are included in the play list as information of the data to be reproduced. An AV stream which is actual data of the content, or commands, are selectively read out by clip information for reproduction sections stipulated by play items included in the play list, and reproduction of the AV stream and execution processing of the commands are performed. Note that a great number of playlists and play items exist, and each has a corresponding playlist ID and play item ID, as identification information.

FIG. 2 illustrates two CPS units. These make up a part of the content stored in the information recording medium. Each of the CPS unit 1 271, and the CPS unit 2 272 are CPS units which have been set as units including a title serving as an index, a movie object which is a reproduction program file, a play list, and a clip including an AV stream file which is the actual contents data.

A content managing unit (CPS unit) 1 271 includes a title 1 211 and title 2 212, reproduction programs 221 and 222, play lists 231 and 232, a clip 241 and a clip 242, and AV stream data files 261 and 262 which are the actual data of the content contained in the two clips 241 and 242 are at least the object data of encryption, and accordingly is set as data encrypted applying a title key (Kt1) which is an encryption key set corresponding to the content managing unit (CPS unit) 1 271 as a rule (also called a CPS unit key).

A content managing unit (CPS unit) 2 271 includes an application 1 213 as an index, a reproduction program 224, playlist 233, and a clip 243, and an AV stream data file 263 which is the actual data of the content contained in the clip 243 is encrypted applying a title key (Kt2) which is an encryption key set corresponding to the content managing unit (CPS unit) 2 272.

For example, in order for the user to execute an application file or content reproducing processing corresponding to the content managing unit 1 271, a title key: Kt1 serving as an encryption key which is set so as to be correlated with the content managing unit (CPS unit) 1 271, needs to be obtained and subjected to decryption processing. In order for the user to execute an application file or content reproducing processing corresponding to the content managing unit 2 272, a title key: Kt2 as an encryption which is set so as to be correlated with the content managing unit (CPS unit) 2 272, needs to be obtained and subjected to decryption processing.

Figure 3:
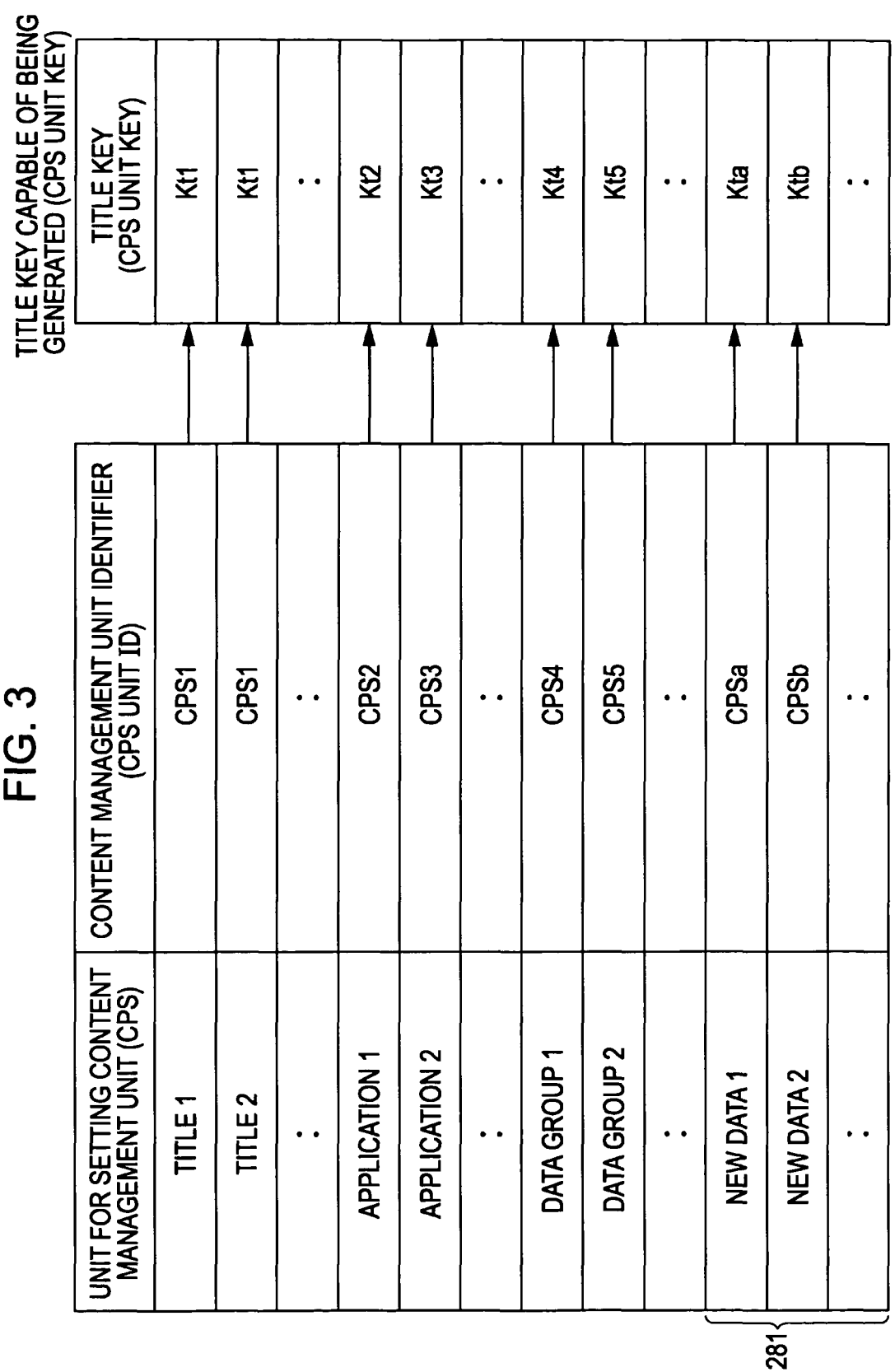
FIG. 3 is a diagram describing the correlation between the content managing unit for settings made regarding stored data in the information recording medium and a unit key.

FIG. 3 shows the CPS unit setting configuration, and example of corresponding title keys. FIG. 3 shows correlation between CPS unit setting units which are units for managing usage of the encrypted content stored in the information recording media, and title keys (the CPS unit keys) applicable to each CPS unit. Note that a CPS unit and title key for data to come later may be stored and set beforehand. For example, the data unit 281 is entries for data to come later.

CPS unit setting units come in a wide variety, such as content titles, applications, data groups, and so forth, and each CPS unit managing table has set therein CPS unit IDs serving as identifiers corresponding to each of the CPS units.

In FIG. 3, title 1 for example is the CPS unit 1, and at the time of decrypting encrypted content belonging to the CPS unit 1, generating the title key Kt1 and performing decryption processing based on the generated title key Kt1 is necessary.

In this way, the content stored in the information recording medium 100 is stored in a manner having been subjected to encryption processing with different encryption keys appropriated to each of the units, in order to realize usage control different for each of the units. UR (usage rules) for each of the content managing units (CPS unit) are set for individual usage management with regard to each of the content managing units (CPS unit). Usage rules are information including, e.g., copy/reproduction control information (CCI) of content, as described above, and is copy restriction information or reproduction restriction information of the encrypted content contained in each of the content managing units (CPS units).

Data processing applying various types of information stored in the information recording medium is necessary for generating a title key. Specific examples of such processing will be described later in detail.

3. Stored-data Control Configuration of an Information Recording Medium

Next, description will be made regarding the stored-data control configuration of an information recording medium. In the event of storing content having a hierarchical structure, which has been described with reference to FIG. 2, in an information recording medium, various types of data, or a program such as content codes or the like, is recorded as an individual file. The directory configuration corresponding to each data to be stored in the information recording medium will be described with reference to FIG. 4.

Figure 4:
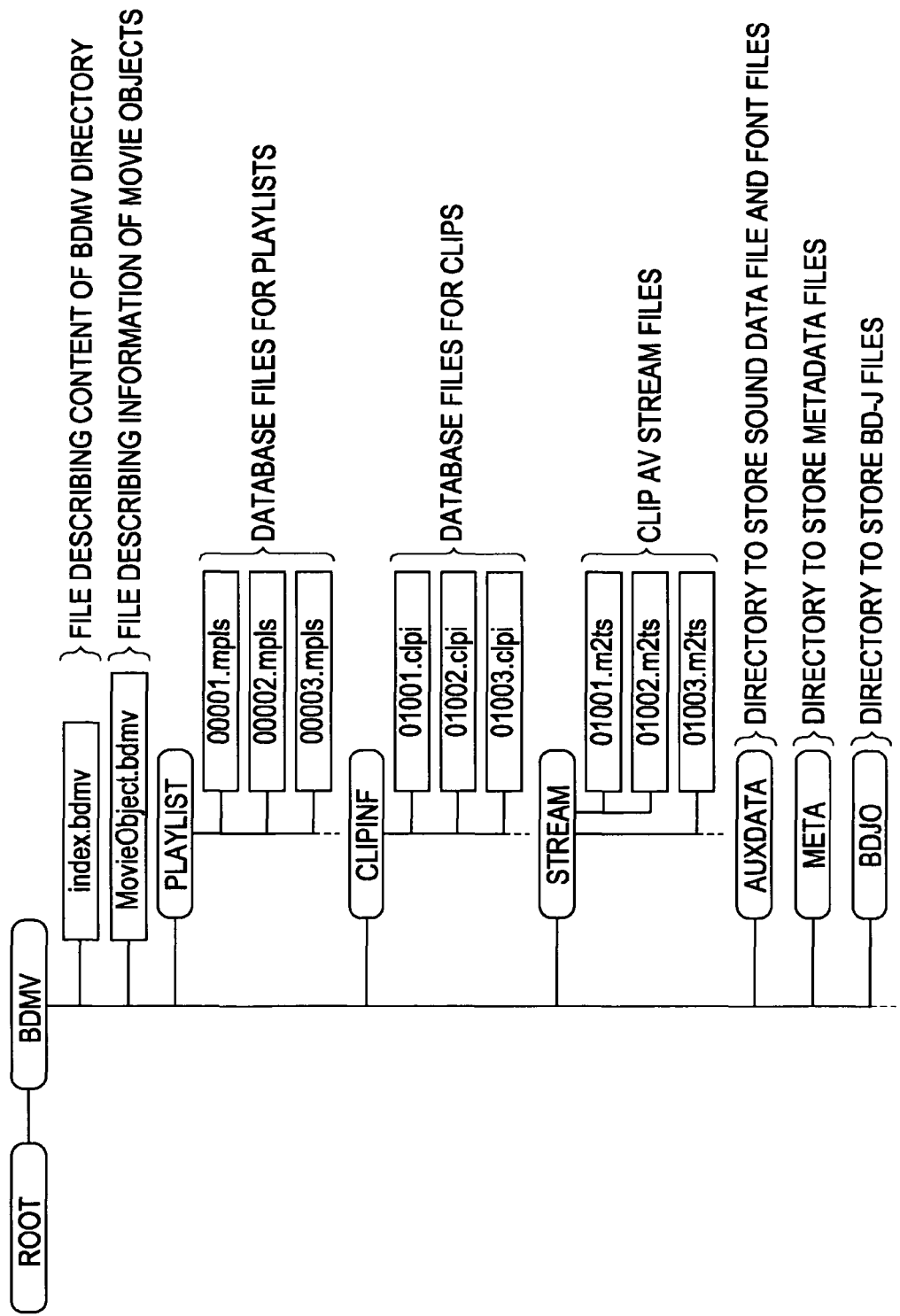
FIG. 4 is a diagram illustrating the directory configuration such as contents, management data, and the like to be recorded in the information recording medium.

(A) The index 210 in FIG. 2 is an index.bdmv file within the directory shown in FIG. 4.

(B) The movie object 220 in FIG. 2 is an MovieObject.bdmv file within the directory shown in FIG. 4.

(C) The playlist 230 in FIG. 2 is a file under the directory PLAYLIST within the directory shown in FIG. 4.

(D) The clip 240 in FIG. 2 corresponds to a pair of a file under the directory CLIPINF within the directory shown in FIG. 4, and a file having the same file number under the directory STREAM.

(E) The others, such as an AUXDATA file storing voice data or font data, a META file storing meta data, a BDOJ file storing a BD-J object, and the like are stored in an information recording medium.

The content to be stored in the information recording medium is, as described above, set as broken data wherein a part of the configuration data of the content is replaced with data different from the correct content data, so decryption processing alone does not reproduce the correct content, and processing for replacing the broken data with data (transformation data) registered in a fix-up table is necessary to perform reproduction. The content codes 105 stored in the information recording medium is applied to this replacement processing, and data transformation processing is executed using the data registered in the fix-up table 106.

Figure 5:
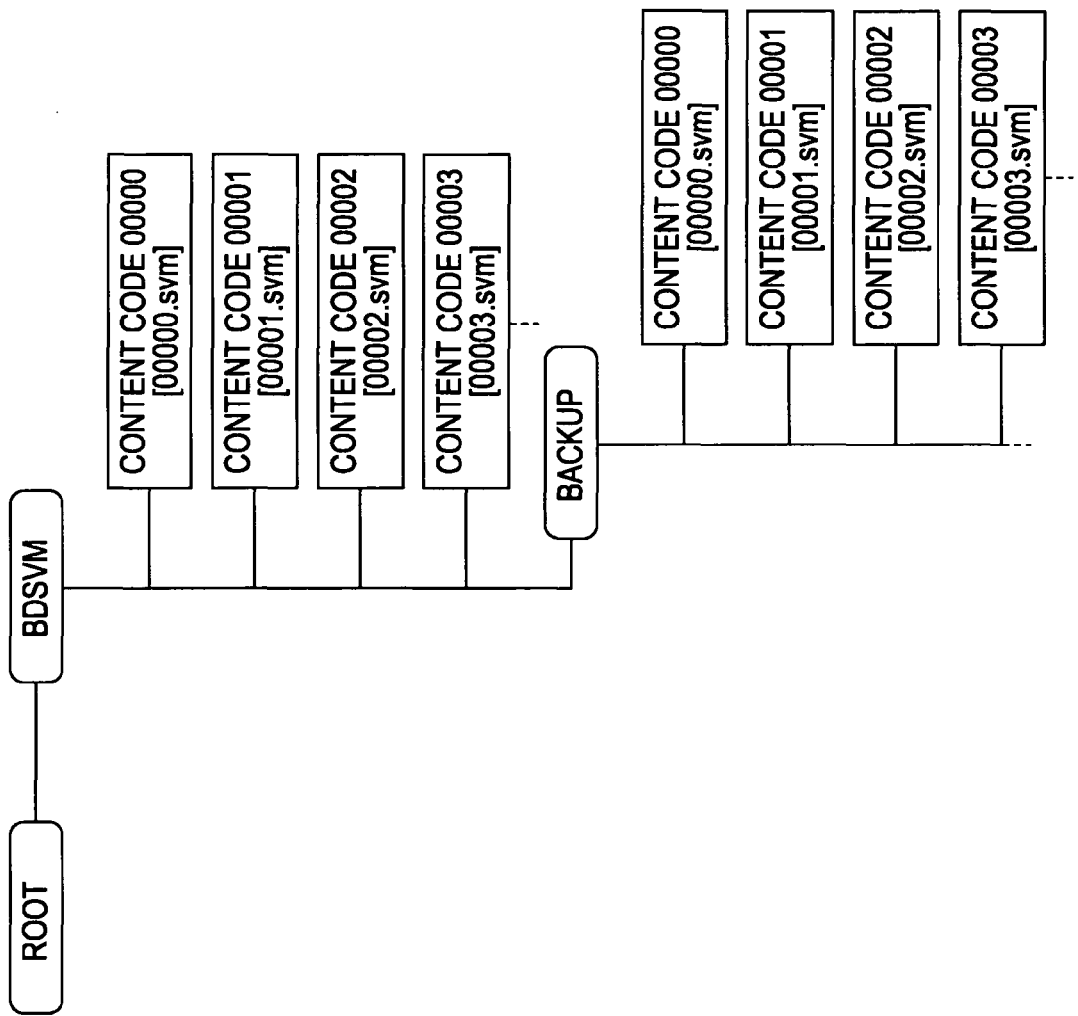
FIG. 5 is a diagram illustrating the directory configuration of content codes to be recorded in the information recording medium.

The content code including this fix-up table is also stored in the information recording medium as an individual file. The directory configuration in which the content codes are set is shown in FIG. 5. FIG. 5 is, for example, a directory configuration of the content codes to be created as to an AV content having the directory configuration in FIG. 4.

Content codes include the fix-up table as described above, and also include information or a program for executing various types of processing such as startup processing, security check processing, or the like as well as the data transformation processing program to which the fix-up table is applied. If these content codes are roughly divided into the following categories, (a) All contents and all players (device or reproduction application) common content codes (b) Content-unique content codes (c) Player (device or reproduction application)-unique content codes (d) Content and Player (Device or Reproduction Application)-unique Content Codes each of content codes differ in the production entity and presentation entity thereof. Accordingly, these content codes having different categories are preferably set as an individual file from the perspective of, for example, recycling of files and the like.

The content code files [00000.svm] through [00003.svm] shown in FIG. 5 indicate individual content code files having different categories which were generated with these different entities. Note that a subsequent stage will explain a specific example of content code files in detail.

As shown in FIG. 5, the content codes are set in the BDSVM directory as multiple individual files, and further backup data serving as copy data is set in the BACKUP directory.

4. Overview of Data Configuration of Content Including Modified Data, and Data Transformation Processing Next, description will be made regarding the overview of data configuration of content including modified data, and data transformation processing. As described above, encrypted content 101 included in the information recording medium 100 is set as broken data wherein part of the configuration data is replaced with data different from the proper content data, so that decryption processing alone does not perform content reproduction at the time of reproduction, and processing for replacing the broken data with the transformation data registered in the fix-up table is necessary.

The configuration of content stored in the information recording medium, and the overview of reproduction processing, will be described with reference to FIG. 6. For example, AV (Audio Visual) content such as a movie is stored in the information recording medium 100. These contents are subjected to encryption, and content reproduction is possible following decryption by processing applying an encryption key obtainable only by a reproduction and device having a certain license. Specific content reproduction processing will be described later. The content stored in the information recording medium 100 is not only encrypted, but also has a configuration wherein the content configuration data has been replaced with modified data.

Figure 6:
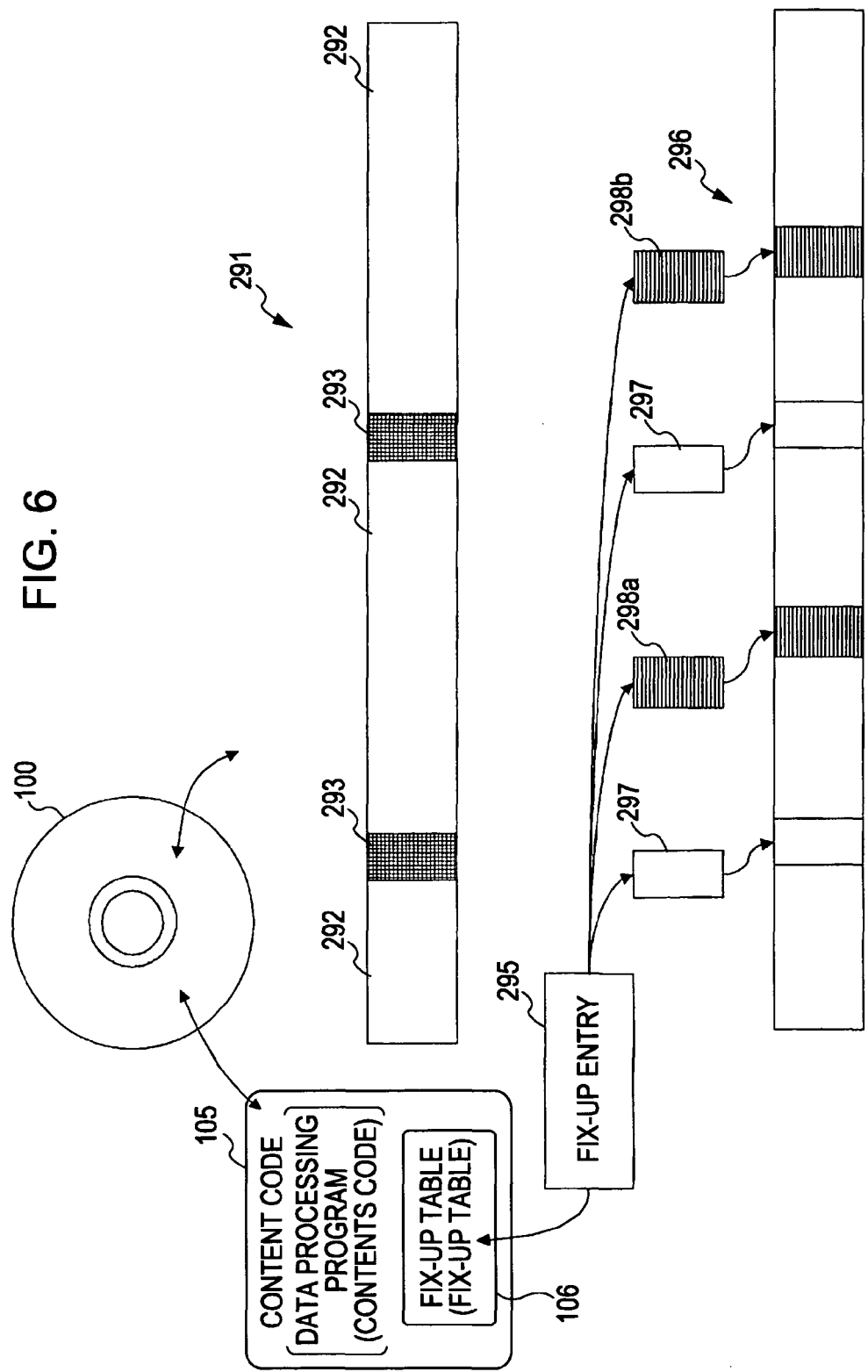
FIG. 6 is a diagram describing content recorded in the information recording medium, and data transformation processing necessary for reproducing the content.

FIG. 6 illustrates the configuration example of a recording content 291 stored in the information recording medium 100. The recording content 291 is configured of normal content data 292 which has not been modified, and broken data 293 which is content that has been destroyed by being modified. The broken data 293 is data which has been destroyed by the original content having been subjected to data processing. Accordingly, proper content reproduction cannot be performed with this content 291 including the broken data.

In order to perform content reproduction, processing for replacing the broken data 293 included in the recorded content 291 with a proper content data, to generate reproduction content 296, is necessary. Data for transforming (transformation data) which is the normal content data corresponding to each of the broken data regions is obtained by obtaining the transformation data from the fix-up entry 295 registered in the fix-up table (FUT) 106 (see FIG. 1) within the content codes 105 recorded in the information recording medium 100, executing processing for replacing with the data of the broken data region, thereby generating and reproducing the reproduction content 296.

Now, at the time of generating reproduction content 296, in addition to the processing for replacing the broken data 293 with transformation data 297 which is normal content data, processing is performed for replacing a partial region of the recorded content 291 with identifier-set transformation data 298 including data enabling analysis of the configuration bits of identification information making a content reproduction device or content reproduction application identifiable (e.g., a player ID). For example, in a case of unauthorized copied content leaking out, analyzing the identifier-set transformation data 298 within the leaked content can enable the source of leakage of the unauthorized content to be determined.

Note that an arrangement may be made wherein the fix-up entries serving as the configuration data in the fix-up table including the transformation data are redundantly recorded in a manner scattered throughout certain packets in the configuration data of the content. That is to say, the transformation data is stored in the fix-up table 106 shown in FIG. 1, and is also scattered and recorded in the encrypted content 101, so as to be recorded in duplicate. An information processing device for executing content reproduction either obtains transformation data stored in the fix-up table 106 to execute data replacement, or obtains a fix-up entry recorded in a scattered manner through the content, to execute data replacement.

Description will be made regarding a configuration example of encrypted contents 300, and content codes 302 including a data transformation processing execution program and a fix-up table, which are stored in the information recording medium 100 with reference to FIG. 7. Content codes 302-0 through 302-n recorded in the information recording medium 100 are recorded in the information recording medium as independent file data corresponding to each content or each clip, for example. The example shown in the drawing illustrates an example wherein n+1 sets of content codes 302-0 through 302-n were recorded in the information recording medium 100.

The respective content codes 302-0 through 302-n include fix-up tables 303-0 through 303-n respectively. Transformation data which is actually used as replacement data of content, and fix-up entries 304-0 through 304-n each of which sets the recording position information thereof are recorded in each of the fix-up tables 303-0 through 303-n. Note that although the example shown in the drawing illustrates all with the application of the variable number [n] as the encrypted contents 300-0 through 300-n, the content codes 302-0 through 302-n, and the fix-up tables 303-0 through 303-n, the set number of the encrypted content 300 and the content code 302 does not need to be the same. For example, an arrangement may be made wherein all of the fix-up tables corresponding to the encrypted contents 0 through n are recorded in the content codes 302-0. Thus, encrypted content and content codes do not necessarily correspond one on one.

Each of the fix-up entries include transformation data to be applied as a replacement data, and recorded position information of the transformation data. Description will be made regarding the data configuration of a fix-up entry to be recorded in the fix-up table with reference to FIG. 8.

FIG. 8 illustrates a data configuration example of one fix-up entry (FixUpEntry) included in a fix-up table block. As shown in FIG. 8, a fix-up entry (FixUpEntry) contains the following data.

type_indicator: Type identifier [00: no transformation, 01b: processing with transformed data, 10b, 11b: processing with transformed data including identification mark]

FM_ID_bit_position: Identification bit position of player ID corresponding to identifier-set transformation data relative_SPN: Position of packet where transformation data is to be applied (number of packets from PMT packet)

byte_position: position where transformation data is recorded in the packet overwrite_value: Transformation data (also including identifier-set transformation data)

relative_SPN_2: Position of packet where second transformation data is applied (number of packets from PMT packet)

byte_position_2: Position where transformed data is recorded in the packet (corresponding to second transformation data)

overwrite_value_2: Second transformation data (also including identifier-set transformation data)

Configuration is made of this data.

A fix-up entry is set as the data recording transformation data for replacing with a part of the content data, and setting position information of the transformation data as to the content, with this fix-up entry being read from the fix-up table to execute the content codes serving as a transformation processing program including content configuration data replacement processing execution commands, thereby performing data transformation.

The information [type_indicator] included in the fix-up entry (FixUpEntry) information shown in FIG. 8 is a type identifier for identifying whether registration information of the fix-up table is (a) or is (b) as follows, i.e.,:

(a) whether registration information relating to transformation data for transforming broken data into proper content data, or (b) registration information relating to identifier-set transformation data for embedding identification information of the reproduction device or content reproduction application.

The registration information [FM_ID_bit_position] is position information of a bit to be referred to from the identification information of the reproduction device or reproduction application made up of multiple bits, in order to determine the manner of processing. The manner of processing is determined for data transformation such that, for example, in the event that the bit value is 1 for the bit to be referred to from the identification information of the reproduction device or reproduction application made up of multiple bits, replacement of content configuration data is executed by the identifier-set transformation data registered in the fix-up table, and in the event that a bit value is 0 for the bit to be referred to, replacement is not executed.

Note that an arrangement may be made wherein transformation is executed in the event that the reference is 0 and transformation is not executed in the event that this is 1. Or, a configuration may be made wherein the transformation data in the case that the reference bit is 0 and the transformation data indicates that this is 1, are set as separate transformation data, and the transformation data is selected and set as suitable according to the bit value of the reference bit.

Figure 7:
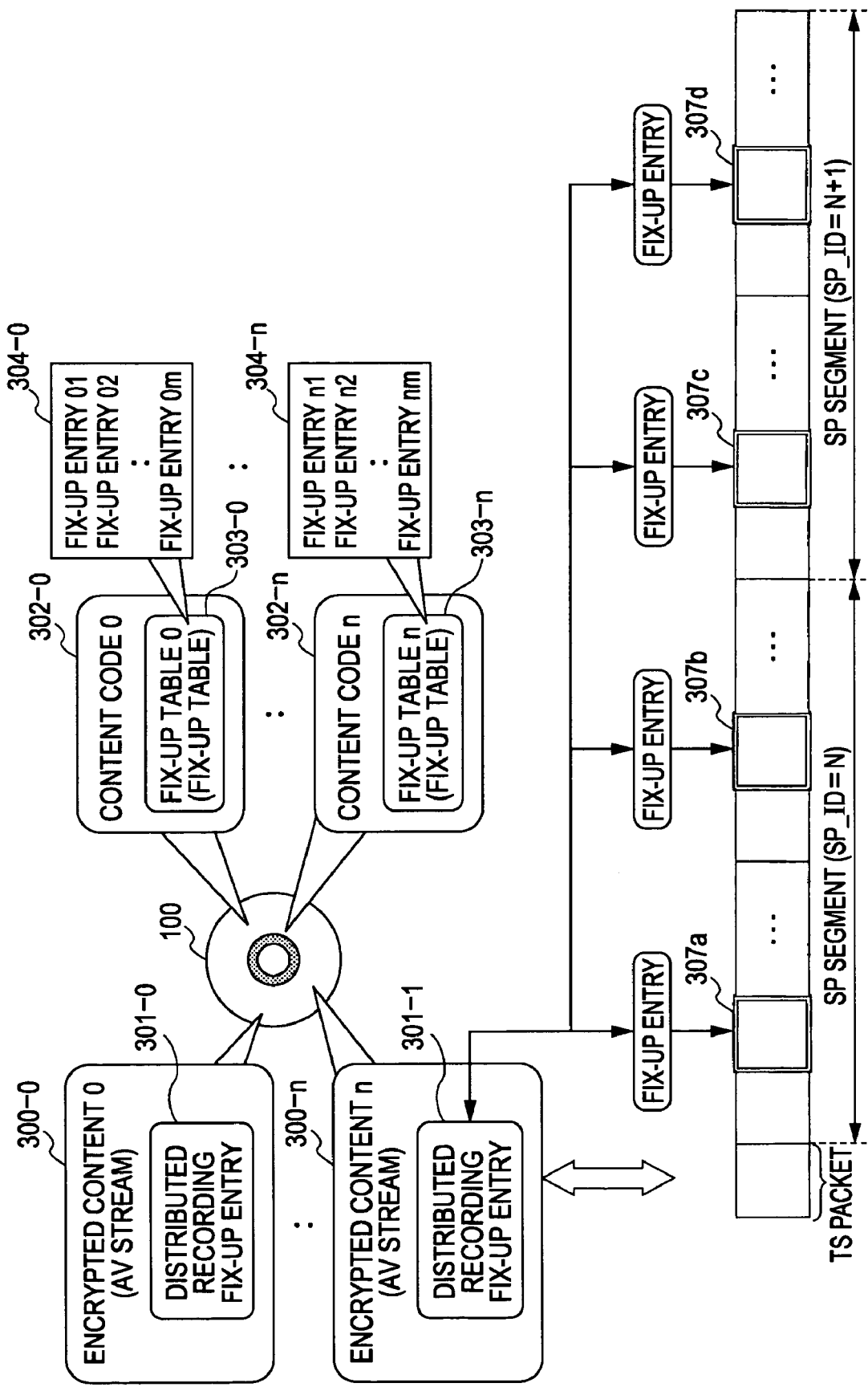
FIG. 7 is a diagram describing the details of the content and the fix-up table stored in the information recording medium.

As shown in FIG. 7, the fix-up entries 301-0 through 301-n are also distributed and recorded in each of the encrypted contents 300-0 through 300-n. The encrypted content 300 is set as a TS packet stream, and packets with fix-up entries stored scattered throughout a part thereof, i.e., fix-up entry storage packets 307a through 307d are set.

Nearby transformation data of the each fix-up entry storing packet is recorded in each of the fix-up entries set as such scattered recording data. The fix-up entries recorded scattered throughout the encrypted content 300 and fix-up entries included in the fix-up table 303 are the same thing, and the information processing device which executes content reproduction performs one or the other of obtaining transformation data from fix-up entries 301 recorded scattered through the content and replacing the data, or obtaining transformation data from fix-up entries 304 in the fix-up table 303 and replacing the data, depending on the specifications of the reproduction (player) application.

As shown in FIG. 7, the content is sectioned into segments of predetermined units of data (SP segments). Fix-up entries that include each transformation data are subjected to computation or encryption processing applying parameters (SP: secret parameters) which differ for each predetermined unit of content (segment units), and stored in the fix-up table 303. The fix-up entry stored in a TS packet within the content is recorded by executing computation or encryption processing which applied a different parameter (SP: secret parameter) for every segment in the same way.

An information processing device which executes the data transformation processing, which is the data replacing processing executed at the time of reproducing the content, sequentially obtains the secret parameters (SP1, SP2, SP3 . . . ), performs computation or encryption processing applying the obtained parameters (SPn) for the fix-up entry corresponding to each segment position, thereby performing processing of obtaining the transformation data.

A specific example of data replacement based on transformation data will be described with reference to FIGS. 9 and 10. First, a processing example of executing data replacement by obtaining fix-up table block configuration data including transformation data that has been recorded scattered through the content, will be described with reference to FIG. 9.

Figure 9:
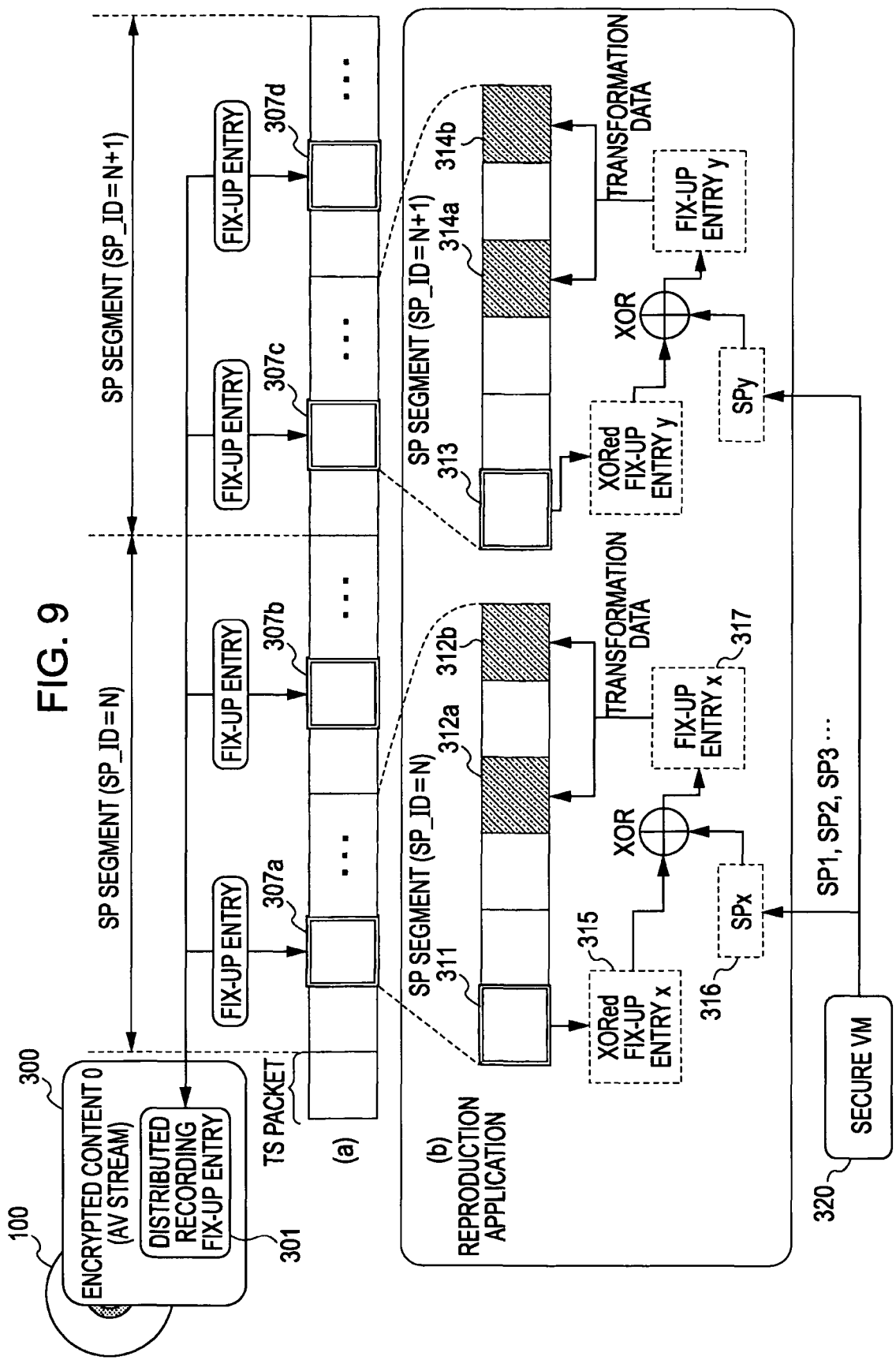
FIG. 9 is a diagram describing data transformation processing applying fix-up entries within TS packets making up the content.

In FIG. 9, (a) illustrates the configuration of the content recorded in the information recording medium 100. The fix-up entries including the transformation data and the recording position information are recorded scattered through the TS packets 307a through d shown in the drawing.

The data replacement processing sequence will be described with reference to (b) in FIG. 9. The processing shown in (b) in FIG. 9 is processing for executing a reproduction (player) application of the host. (b) in FIG. 9 illustrates a part of the TS packet stream of the content belonging to segment ID=N, N+1, in the content configuration data.

For example, the packet 311 including the fix-up entry recorded in segment ID=N stores an XORed fix-up entry 315 which is the result data of exclusive-OR computation with the secret parameter (SPx). The host reproduction (player) application which executes the data replacement processing performs exclusive-OR computation with the secret parameter (SPx) 316 with regard to the XORed fix-up entry 315, thereby obtaining the fix-up entry 317, and obtains the transformation data and recording position information from the fix-up entry 317, to execute the replacement processing for the packets 312a and b at the data replacement position.

The parameter (SPx) applied for the computation to obtain the fix-up entry 317 is supplied from the secure VM 320. For example, the reproduction (player) application obtains a secret parameter ID (SP_ID) serving as secret parameter specification information corresponding to each segment, and outputs a secret parameter calculation request including notification of the secret parameter ID as an interruption (INTRP) request to the secure VM, in order to obtain the secret parameter (SPn) necessary for each segment of the content. The secure VM calculates the secret parameter (SPx) corresponding to the (SP_ID) in response to the secret parameter calculation request from the reproduction (player) application, and provides this to the reproduction (player) application as a response (Call).

As shown in FIG. 9, different segments have different parameters for the parameters (SPx) to be applied to the computation for obtaining the fix-up entries. For example, each segment is set to around 10 seconds of content reproduction time, and the reproduction (player) application receives parameters which differs for each segment every 10 seconds from the secure VM, restores the fix-up entry, obtains the transformation data from the restored fix-up entry, and executes the data replacing processing.

Next, description will be made with reference to FIG. 10, regarding the overview of processing in the case of performing the data replacement as to content by applying not the fix-up entry distributed and recorded in the content but the fix-up entry 304 in the fix-up table 303 of the content code 302 stored in the information recording medium.

Figure 10:
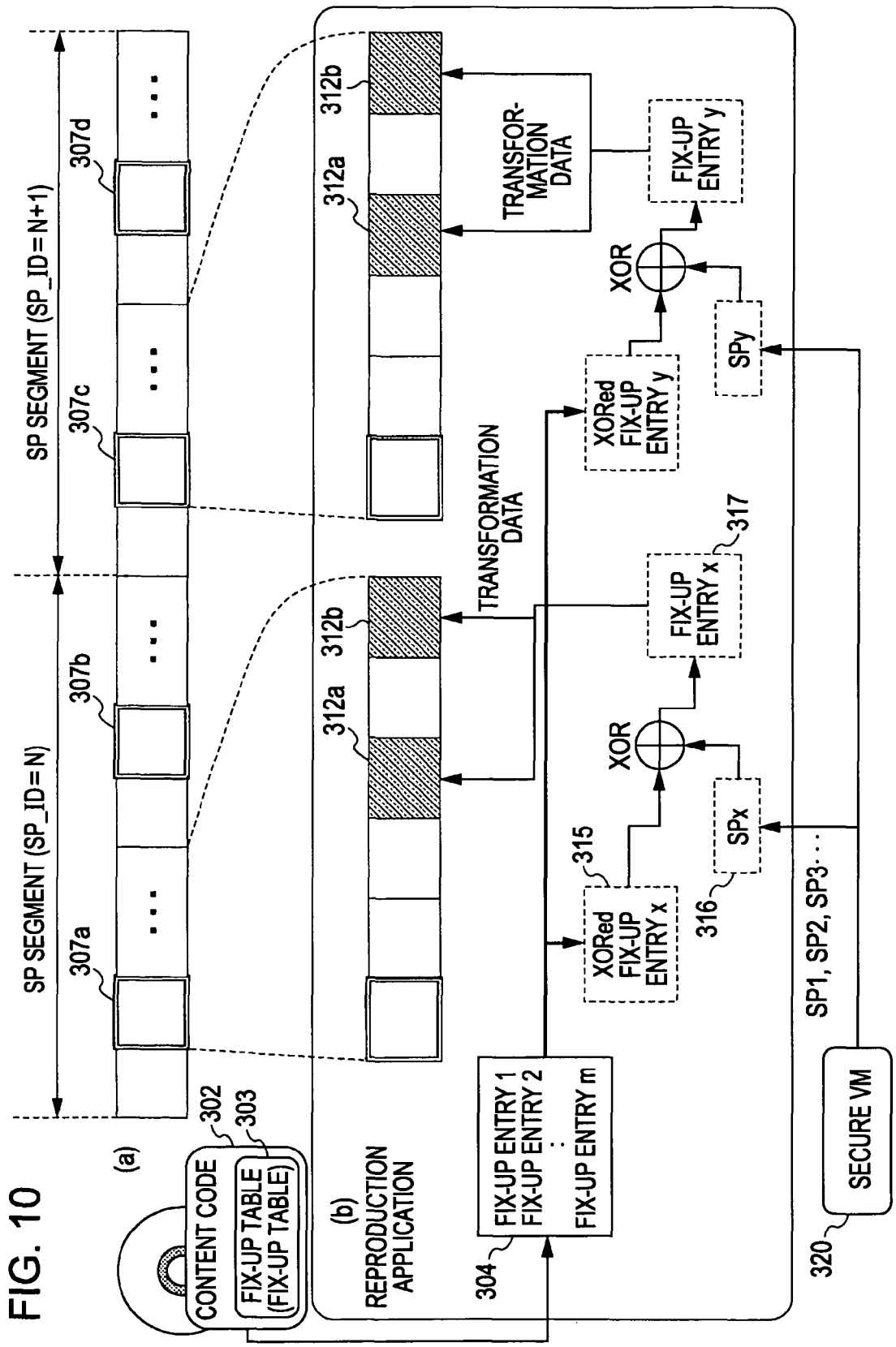
FIG. 10 is a diagram describing data transformation processing applying fix-up entries included in a fix-up table.

As shown in (a) in FIG. 10, as with the description with reference to FIG. 9, the content is sectioned into segments of predetermined units of data. The fix-up entry 304 that includes the transformation data recorded in the fix-up table 303 is subjected to computation or encryption processing applying parameters (SP: secret parameters) which differ for each predetermined unit of content (segment units).

An information processing device which executes the data transformation processing, which is the data replacing processing executed at the time of reproducing the content, sequentially obtains the secret parameters (SP1, SP2, SP3 . . . ), performs computation or encryption processing applying the obtained parameters (SPn) for the fix-up entry including the transformation data corresponding to each segment position, thereby performing processing of obtaining the transformation data.

The data replacement sequence will be described with reference to (b) in FIG. 10. The processing shown in (b) in FIG. 10 is processing which is executed at the host reproduction (player) application. (b) in FIG. 10 illustrates a part of the content TS packet stream belonging to segment ID=N, N+1, in the content configuration data.

For example, in the event of executing data replacement regarding the segment ID=N, the fix-up entries 304 are acquired from the fix-up table 303, and then the fix-up entry corresponding to the segment ID=N is selected from the acquired fix-up entries 304. However, this fix-up entry x 315 is recorded in the fix-up table 303 as an XORed fix-up entry 315 obtained by calculating an exclusive-OR operation as to a segment-unique secret parameter (SPx) correlated with the segment N.

The reproduction (player) application of the host to execute the data replacement processing obtains the fix-up entry 317 by executing exclusive-OR computation with the secret parameter (SPx) 316 provided from the secure VM 320 with regard to the XORed fix-up entry 315, obtains the transformation data and recorded position information from the fix-up entry 317, and performs the replacement processing with the packets 302a and b of the data replacement positions.

The parameter (SPx) to be applied for the computation for obtaining the fix-up entries 317 is supplied from the security of the VM 320 in the same way as the processing example described above. For example, the reproduction (player) application obtains the secret parameter ID (SP_ID) which is secret parameter specification information corresponding to each segment, and outputs a secret parameter calculation request including notification of the secret parameter ID as an interruption (INTRP) request to the secure VM, in order to obtain the secret parameters (SPn) necessary for each segment of the content. Note that the information necessary for acquiring the secret parameter ID (SP_ID) is, for example, stored in the fix-up table 303.

The secure VM calculates the secret parameter (SPx) corresponding to the SP_ID in response to this secret parameter calculation request from the reproduction (player) application, and provides this to the reproduction (player) application as a response (Call).

As shown in FIG. 10, different segments have different parameters for the parameters (SPx) to be applied to the computation for obtaining the fix-up entries. For example, each segment is set to around 10 seconds of content reproduction time, and the reproduction (player) application receives parameters which differs for each segment every 10 seconds from the secure VM, restores the fix-up entry, obtains the transformation data from the restored fix-up entry, and executes the data replacement processing.

Thus, the reproduction (player) application for executing content reproduction receives secret parameters from the secure VM and in units of each segment, executes computation, executes restoration of fix-up entries which are the configuration data of the six-up table block, and obtains the restored fix-up entries and performs data replacement. Note that while the above-described processing example has been made illustrating a case of using exclusive-OR (XOR) as the computation applying the secret parameters, other competition processing may be applied as well. Also, an arrangement may be made wherein encryption processing or the like is executed applying secret parameters.

5. Processing of Reproduction (Player) Application and Secure VM

In the case of executing the above-described processing, the reproduction (player) application sequentially obtains different secret parameters (SP1, SP2, SP3 . . . ) in certain segment units, while carrying out content reproduction, meaning that it becomes necessary for secret parameters to be obtained with regard to the secure VM and data replacement is performed each time the reproduction segment switches.

In the case of executing the acquisition processing of this secret parameter (SP), the reproduction (player) application notifies the secure VM of the secret parameter ID (SP_ID) as secret parameter specification information, thereby determining the necessary SP. The information for acquiring this secret parameter ID (SP_ID) is, for example, recorded in the fix-up table, and the reproduction (player) application acquires the secret parameter ID (SP_ID) corresponding to a segment based on the information recorded in the fix-up table.

The reproduction (player) application transmits and receives a data-processing request and response as to the secure VM in acquisition processing of this secret parameter (SP) and so forth. The series of processing sequences carried out by the reproduction application and secure VM will be described with reference to FIG. 11.

As described earlier with reference to FIG. 1, transfer of information or processing requests between the reproduction (player) application 150 and secure VM 160 is carried out by a sequence of interruptions (INTRP) from the reproduction (player) application 150 to the secure VM 160, and responses (Call) processing this from the secure VM 160 to the reproduction (player) application 150.

Figure 11:
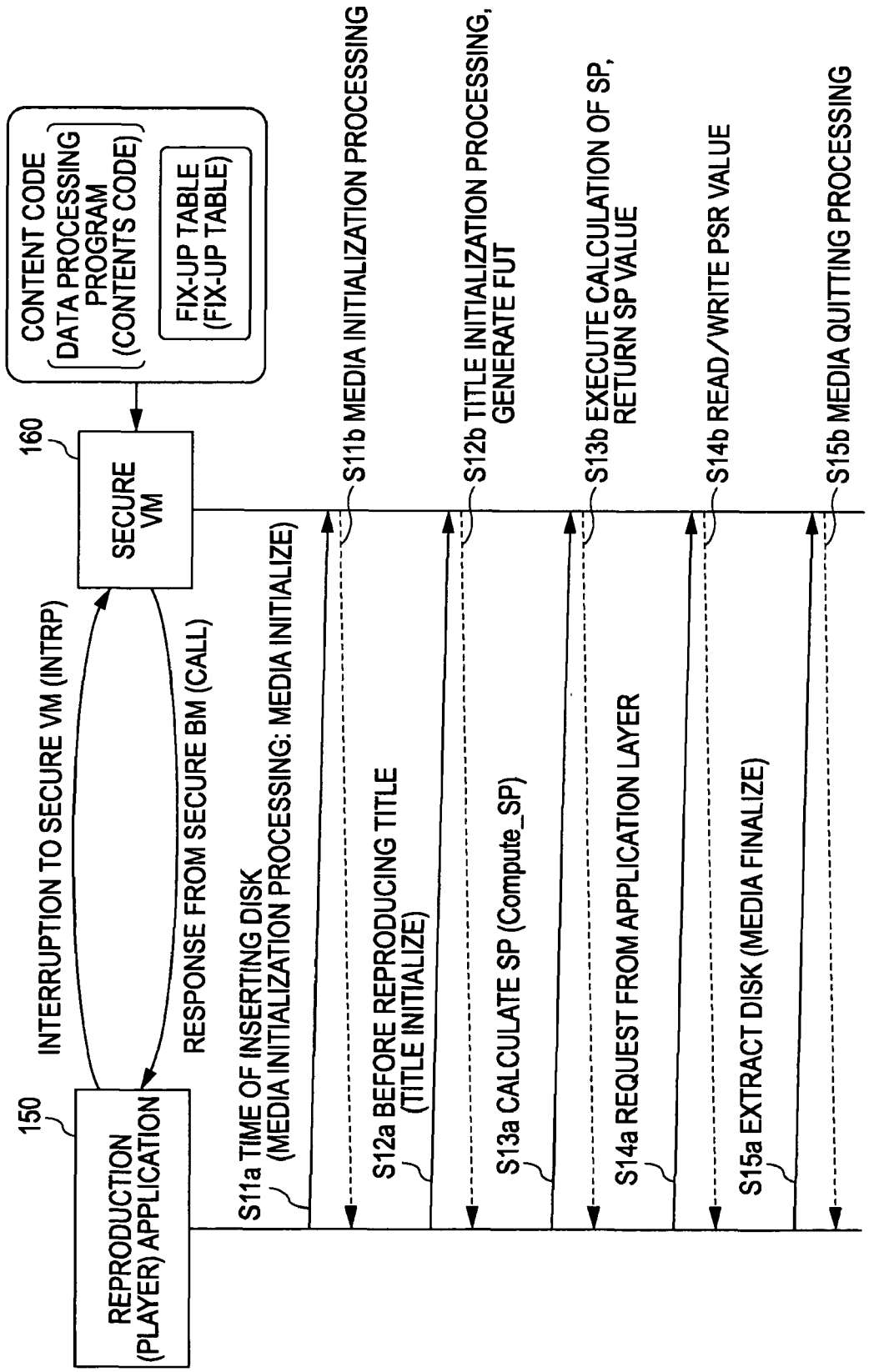
FIG. 11 is a diagram describing the processing sequence carried out between a reproduction (player) application and a secure VM.

The processing sequence shown in FIG. 11 is a diagram illustrating the types of processing executed between the reproduction (player) application 150 and the secure VM 160 from the point of inserting the information recording medium storing content, to ejecting thereof.

For example, step S11 is processing for media initialization (Media Initialize) which is executed as processing at the time of inserting an information recording medium (Disc), wherein the reproduction (player) application 150 loads a content code file (Content Code File) storing code information necessary for the initial reproduction processing into its memory, and starts execution. The content code file (Content Code File) determines the manufacturer, model, and so forth of the reproduction (player) application.

For example, the secure VM 160 determines whether or not the obtained model is a model regarding which a security problem has occurred in the past, and in the event that this is a model regarding which a security problem has occurred in the past, a check is made by executing the content code (Content Code) regarding whether or not a similar security problem has occurred. For example, certain values in the RAM of the information processing device, or operations of a certain device are checked, inspecting whether or not they are in a correct state. Note that a check program for each model may not be included in that initially-loaded content code file, and in this case another necessary content code file is accessed. Upon completion of the initialization processing by the secure VM 160, a response (Call) is notified to the reproduction application 150, and the flow proceeds to the next step S12.

In step S12, title initialization processing (Title Initialize) is executed. The title is applied it as specified information of the content to be reproduced, a title corresponding to certain content to be reproduced is selected based on user specifications or the like, and a title initialization processing request is output from the reproduction (player) application 150 to the secure VM 160, along with title information.

The secure VM 160 generates a fix-up table on the memory of the secure VM 160 by collecting transformation data information corresponding to all clips necessary for reproducing the title, and notifies the reproduction (player) application 150 of the position in the memory where the table has been stored, such that the reproduction (player) application 150 can obtain the table. Note also that a security check the same as that for the media initialization in step S11 can be performed during title initialization.

Figure 12:
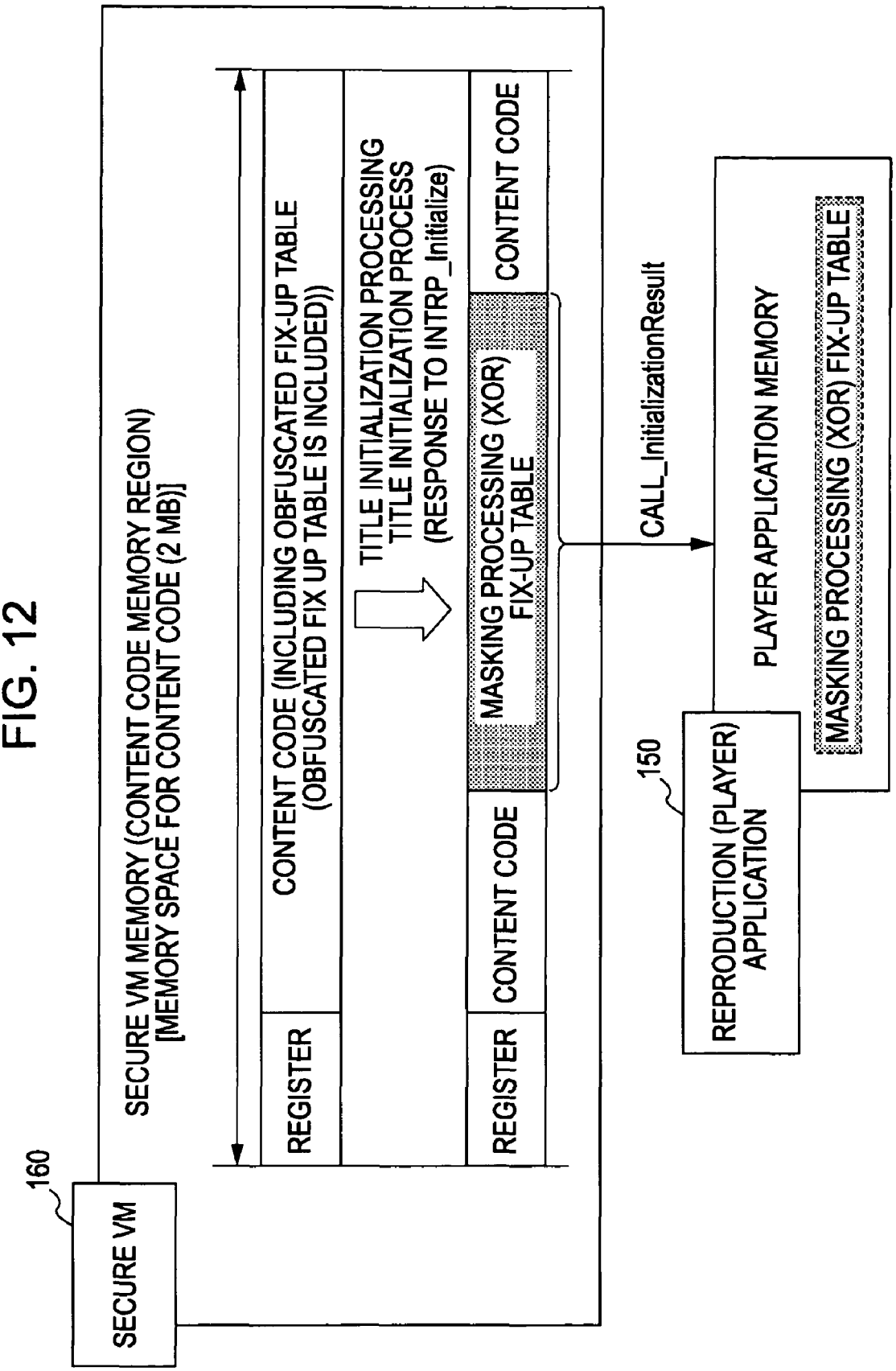
FIG. 12 is a diagram describing processing for copying a fix-up table, carried out in the title initialization processing within the processing sequence between the reproduction (player) application and the secure VM.

An example of processing for generating a fix-up table on the memory of the secure VM 160 by collecting transformation data corresponding to all clips necessary for reproducing the title, which is executed during the title initialization processing, will be described with reference to FIG. 12. FIG. 12 illustrates a memory region (e.g., 2 MB) which the secure VM 160 can use. The content code which is code information including the data transformation processing program which the secure VM 160 has obtained from the information recording medium is stored here. Note that this content code includes a fix-up table subjected to obfuscation processing such as encryption or the like. Further, one example of the data transformation processing program is for deriving a key (SP: secret parameter) for changing a fix-up table subjected to obfuscation processing into normal text. In other words, a program acquiring a fix-up table and using the position information (relative packet number) and overwrite information (overwrite_value) thereof can be maintained by the reproduction device (reproduction application) rather than the information recording medium.

Upon input of the title initialization request from the reproduction (player) application 150, the secure VM 160 performs decryption processing of the fix-up table collecting transformation data information corresponding to all clips necessary for reproducing the title, from the content code as necessary, stores this in memory in a state subjected to processing such as the above-described XORed state (masked state), and notifies this memory storage position to the reproduction (player) application 150. This notification processing is executed as a response (Call) to the title initialization request (INTRP) from the reproduction (player) application 150.

Upon receiving a response (Call) from the secure VM 160 regarding the title initialization request (INTRP), the reproduction (player) application 150 copies and stores a necessary data portion from the fix-up table storing region in the memory region which the secure VM 160 uses, to a memory region which the reproduction (player) application 150 can use. For example, a secret parameter ID (SP_ID) determining table for obtaining a secret parameter ID (SP_ID) corresponding to a segment of the content, described earlier with reference to FIGS. 6 through 9, is extracted and copied and stored in the memory region which the reproduction (player) application 150 can use.

The reproduction (player) application 150 stores all the information necessary for content transformation processing, and reproduction processing, such as the configuration data of the fix-up table storing fix-up entries, information for specifying the secret parameter ID (SP_ID) corresponding to a segment included in the fix-up table, and the like, in the memory region which the reproduction (player) application 150 can use at this copy processing.

Returning to FIG. 11, description will be continued regarding the processing sequences between the reproduction (player) application 150 and secure VM 160. Step S13 is processing corresponding to the secret parameter (SP) calculation (Compute_SP) wherein the reproduction (player) application 150 outputs a SP calculation request (INTRP) to the secure VM 160, and the secure VM 160 returns the calculation results (SP) to the reproduction (player) application 150 as a response (Call). The reproduction (player) application 150, in the event of outputting the SP calculation request (INTRP) to the secure VM 160, and gives notification of the SP_ID serving as SP specification information.

The processing in step S14 is a request processing from the reproduction (player) application 150 to the secure VM 160, for other than the secret parameter calculation. For example, in the event that this is request processing for execution of a security check, the secure VM 160 executes the processing according to the request, and makes notification to the reproduction (player) application 150 regarding the processing results as a response (Call). Note that a register regarding which both the reproduction (player) application 150 and the secure VM 160 is capable of writing to and reading from is used for this information transfer, such as a player status register, register (PSR), for example.

The processing in step S15 is media finalizing (Media Finalize) processing at the time of ejecting the information recording medium (Disc), with the content code (content code) processing status being recorded in nonvolatile memory. This processing enables past security check information to continue to be used the next time the disk is inserted.

As described above, transfer of information, or processing requests and responses between the reproduction (player) application 150 and the secure VM 160 is carried out by interruption (INTRP) from the reproduction (player) application 150 to the secure VM 160, and response (Call) processing from the secure VM 160 to the reproduction (player) application 150.

6. Content Reproduction Processing

Figure 13:
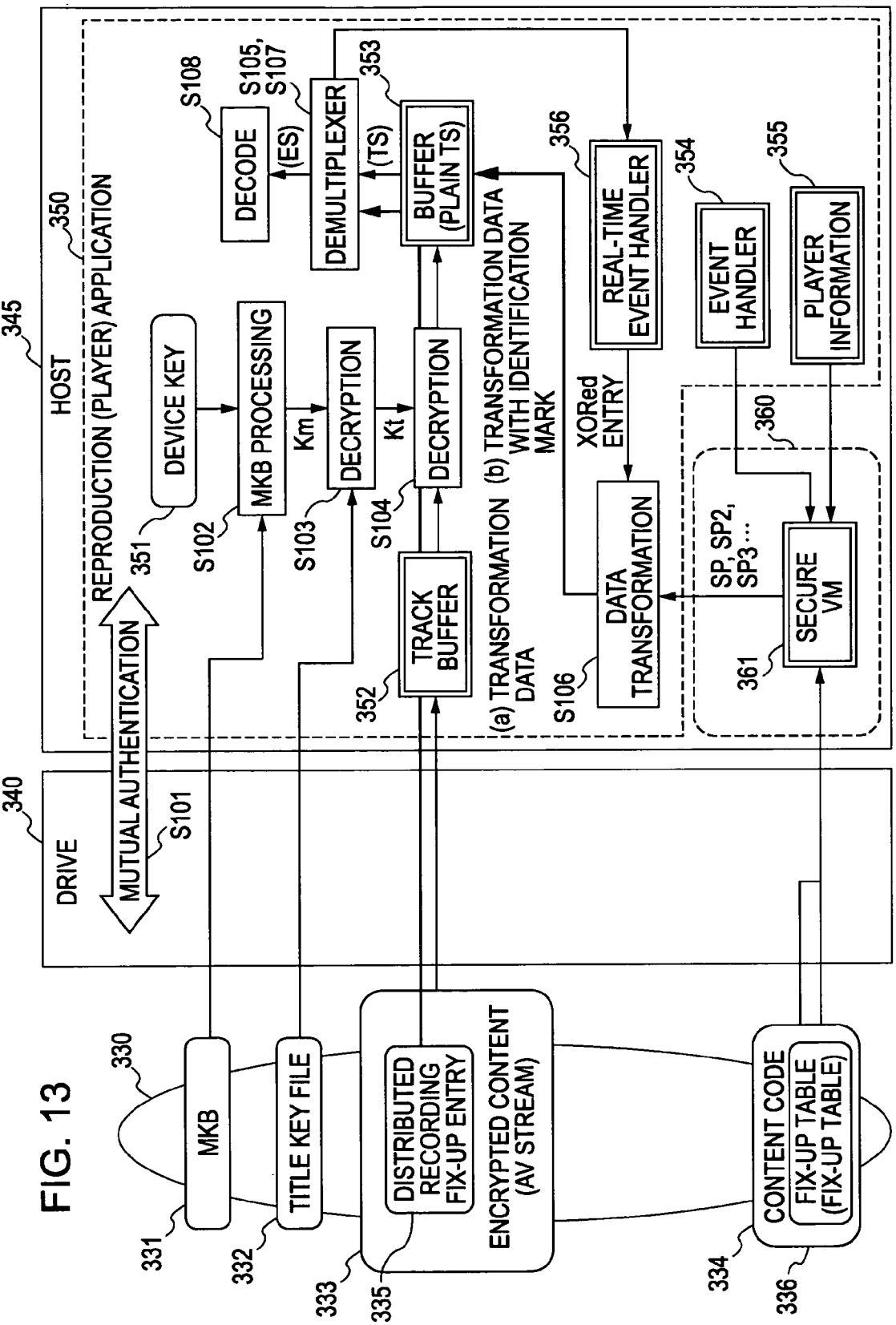
FIG. 13 is a diagram describing a processing example of content reproduction processing.

Next, content reproduction processing which the host executes will be described with reference to FIG. 13. FIG. 13 illustrates, from the left, an information recording medium 330 storing encrypted contents, a drive 340 into which the information recording medium 330 is set so as to execute data reading, and a host 345 which is connected with the drive so as to be capable of data communication, and which obtains the content stored in the information recording medium 330 by the drive 340 and executes a reproduction application which executes reproduction processing thereof.

Note that the host 345 shown in FIG. 13 is shown sectioned into a reproduction (player) application block 350 which executes processing such as content decryption, decoding, data transformation, and so forth, and the secure VM 360 block having a secure VM 360 which executes secret parameter (SP) calculation processing and so forth.

Content code 334 including an MKB (Media Key Block) 331, a title key file 332, encrypted content 333, and a transformation processing program, is distributed and recorded in the information recording medium 330, the encrypted content 333 includes fix-up entries 335, and the content code includes the fix-up table including the same fix-up entries. The host 345 holds the device key 351 to be applied to the MKB processing.

The processing sequence wherein the host 345 shown in FIG. 13 obtains and reproduces the stored content within the information recording medium 330 via the drive 340 will be described. First, before reading out the stored content in the information recording medium 330, the host 345 and drive 340 execute mutual authentication in step S101. This mutual authentication is processing for confirming that the host and drive are each authorized devices or application software. Various types of processing can be applied to this mutual authentication processing sequence. As a result of the mutual authentication processing, the drive 340 and host 345 share a session key (Ks) serving as a shared secret key.

In step S101, following mutual authentication being executed between host and drive, and the session key (Ks) shared, the reproduction (player) application 350 of the host 345 obtains the MKB 331 recorded in the information recording begins 330 by the drive in step S102, executes processing of the MKB 331 applying the device key 351 stored in memory, and obtains the media key (Km) from the MKB.

As described above, the MKB (Medium Key Block) 331 is an encryption key block generated based on a tree structure key distribution system known as a type of broadcast encryption method, and is the key information block enabling obtaining of a media key (Km) which is a key necessary for content decryption, only by processing (decryption) based on the device key (Kd) stored in a device which has a valid license.

Next, in step S103, the media key (Km) obtained by the MKB processing in step S102 is applied to execute decryption of the title key file 332 read from the information recording medium 330, thereby obtaining the title key (Kt). The title key file 332 stored in the information recording medium 330 is a file including data encrypted by the media key, and the title key (Kt) used for decryption of content can be obtained by processing applying the media key. Note that the decryption processing in step S103 applies an AES encryption algorithm, for example.

Next, the reproduction (player) application 350 of the host 345 reads out the encrypted content 333 stored in the information recording medium 330 via the drive 340, stores the read out content in the track buffer 352, executes decryption processing applying the title key(Kt) in step S104 for the contents stored in the buffer, and obtains the decrypted content.

The decrypted content is stored in a plaintext TS buffer 353. (Plain TS) means a decrypted plaintext transport stream. Now, the decrypted content stored in the plaintext TS buffer 353 is content containing the above-described broken data, which cannot be reproduced as it is, and there is the need to perform predetermined data transformation (data replacement by overwriting).

The processing example shown in FIG. 13 is a processing example where fix-up entries recorded scattered in certain packets within the configuration data of the encrypted content are obtained, transformation data is extracted therefrom, and data replacement is performed. That is to say, this is equivalent to the data transformation processing described with reference to FIG. 9 earlier.

The fix-up entries divided and recorded in the content is data recording the transformation data (or identifier-set transformation data) for performing replacement processing regarding the decrypted content, and the recorded position where the transformation data is recorded.

The secure VM 361 reads out the content code 334 including the data transformation processing program which includes the command code information from the information recording medium 330, and intermittently generates and outputs secret parameters (SP1, SP2, SP3 . . . ) necessary for changing the fix-up table recorded in the information recording media 330 along with the content into a plaintext fix-up table, during contents reproduction or before output processing and during processing, based on control from an event handler 354, and input of player information 355. This processing is performed intermittently.

The secret parameters (SP1, SP2, SP3 . . . ) are, as described above, computation for encryption processing parameters which switch over for segments corresponding to predetermined content data units, and specifically are, for example, exclusive-OR (XOR) operation parameters. The secure VM 361 executes processing for intermittently generating and outputting parameters (SP1, SP2, SP3 . . . ) necessary for restoring the fix-up entries which are the configuration data of the fix-up table block modified by computation processing of encryption processing, based on requests from the reproduction (player) application.

At the reproduction (player) application 350, in step S104, decryption of the encrypted content 333 including fix-up entries is executed, the fix-up entries which are configuration data of the fix-up table recorded in the content are separated by processing of a demultiplexer in step S105, and table restoration and data transformation processing is executed in step S106 under control of the real-time event handler 356. Due to the control of the real-time event handler 356, the reproduction (player) application 350 outputs a secret parameter calculation request corresponding to switching over of segments as an interruption (INTRP) to the secure VM 361, receives secure parameters (SP1, SP2, SP3 . . . ) from the secure VM 361, executes decryption or computation of the fix-up table block to obtain the plaintext fix-up table block, and obtains fix-up entries contained in the obtained fix-up table block.

Fix-up entries record transformation data, i.e.,
(a) transformation data
(b) identifier-set transformation data
and recording position specifying information in the content of the above transformation data, with the reproduction (player) application 350 executing data transformation processing for writing to the specified position in step S106 as real-time processing in parallel with content reproduction processing or external output processing.

For example, in the event that the parameters (SP1, SP2, SP3 . . . ) are exclusive-OR (XOR) operation parameters with the fix-up entry corresponding to a segment serving as the units of predetermined content portion data, the restoration processing in step S106 is as follows:
[Fix-up entry 1] (XOR) [SP1]
[Fix-up entry 2] (XOR) [SP2]
[Fix-up entry 3] (XOR) [SP3]
and so on.

Exclusive-OR operation processing thereof is executed, thereby obtaining fix-up entries included in the fix-up table block data. Note that in the above expressions, [A] (XOR) [B] means an exclusive-OR operation of A and B.

Thus, the fix-up entries included in the content 333 recorded in the information recording medium are stored by calculating an exclusive-OR operation with the secret parameters (SP1, SP2, SP3, and so on). These parameters are continuously obtained and output by the secure VM 361.

In the table restoration and data transformation processing in step S106, the transformation data is obtained from fix-up entries restored by obtaining with computation or encryption processing applying the secret parameters (SP1, SP2, SP3 . . . ), the broken data included in the content is replaced with transformation data which is the proper content configuration data, and further, data overwriting processing wherein identifier-set transformation data is replaced with a part of the data of the content is executed, thereby changing the stored data in the plaintext TS buffer 353 into transformed data. The overview of this data transformation processing will be described with reference to FIG. 14.

The encrypted content 333 stored in the information recording medium is temporarily stored in a track buffer 352 at the host side. This is the track buffer stored data 401 shown in FIG. 14(1). Decryption of the encrypted content which is the track buffer stored data 401 is executed by the host-side decryption processing, and the decryption result data is stored in the plaintext TS buffer 353. This is the decryption result data 402 shown in FIG. 14(2).

The decryption result data 402 includes broken data 403 which is not the proper content configuration data. The data transformation processing unit of the host executes processing for replacing this broken data 403 with the transformation data 404 which is the correct content configuration data. This replacing processing is executed as re-writing (overwriting) of a part of data, regarding data written to the plaintext TS buffer 353, for example.

Figure 14:
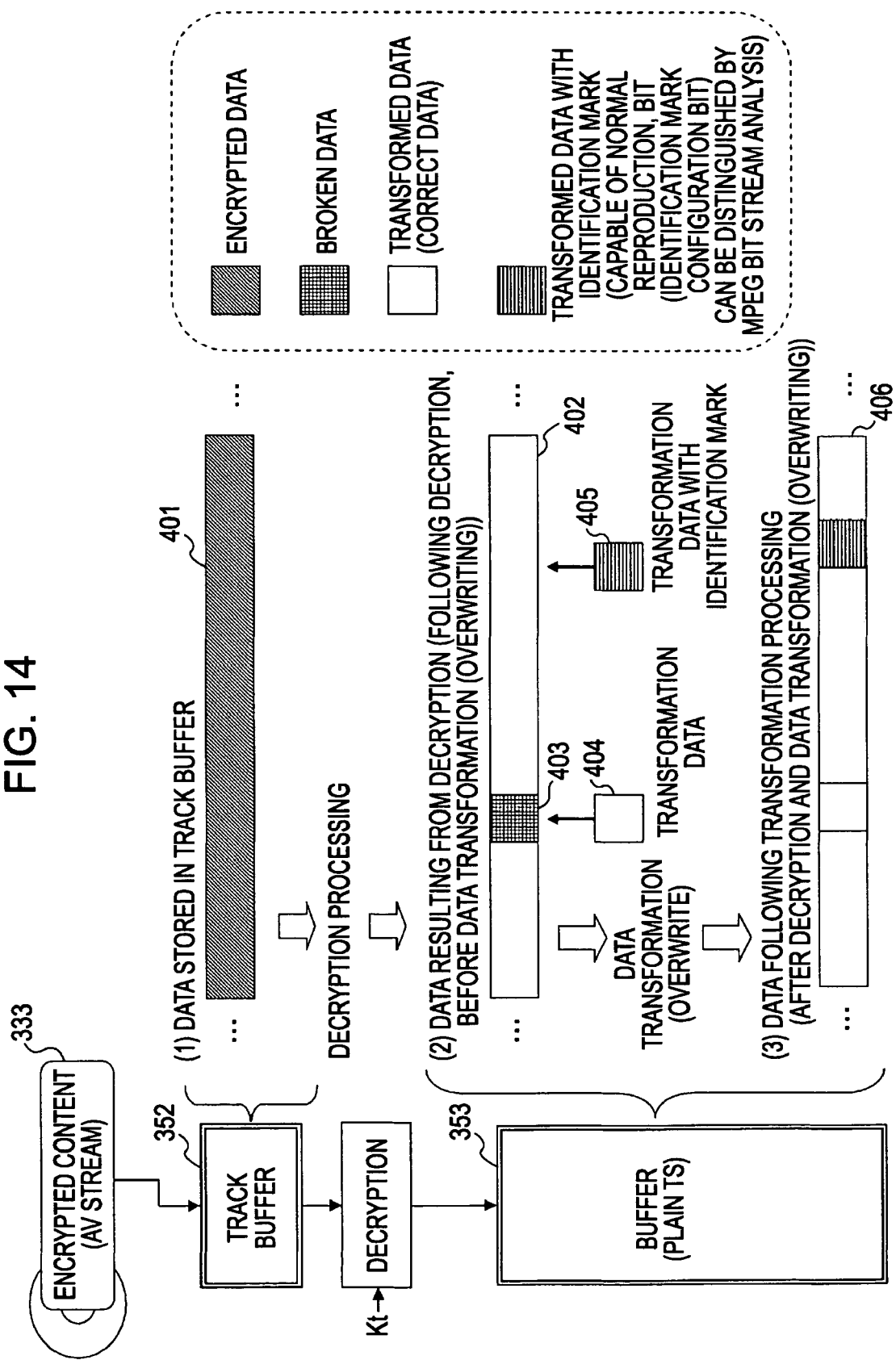
FIG. 14 is a diagram describing data transformation processing executed at the time of content reproduction.

Further, the data transformation processing which the host executes is not only processing for replacing the broken data with transformation data which is the normal content data, but also processing is executed for replacing a part of the configuration data in the decryption result data 402 with identifier-set transformation data 405, as shown in FIG. 14.

An identifier is data which enables configuration bits of identification information making a content reproducing device or content reproducing application identifiable, as described above. A specific example is the configuration data of identification information (player ID) of an information processing device serving as a player for executing a host application, or an identification mark generated based on the player ID. Identifier-set transformation data is data wherein bit values of the correct content data have been slightly changed within a level that does not affect reproduction of the content, as described above.

A great number of identifier-set transformation data 405 are set within the content, and collecting and analyzing the multiple sets of identifier-set transformation data 405 determines the player ID, for example. Identifier-set transformation data 405 is data wherein the configuration bits of the normal content data have been changed within a level wherein normal reproduction can be made as content, and this data wherein bit (identification mark configuration bit) determining is enabled by MPEG bit stream analysis.

A great number of the transformation data 404 and identifier-set transformation data 405 shown in FIG. 14 is registered in the fix-up table stored in the information recording medium, and further, registration is made regarding the write position information of these. Executing data transformation processing based on the fix-up tables stored information replaces the data stored in the plaintext TS buffer 353 with the transformed data 406 shown in FIG. 14(3).

Subsequently, the transformed TS (Transport stream) is externally output via a network or the like, and is reproduced as an external reproducing apparatus. Or, transformation from a transport stream (TS) to an elementary stream (ES) is executed in step S107 by processing by a demultiplexer, and further, following decoding processing (step S108), this is reproduced via a display speaker.

7. Content Code Management Configuration

As described above, with reproduction of the content recorded in the information recording medium, it is necessary to perform processing by reading out content codes from the information recording medium, applying the fix-up table included in the content codes, and applying the transformation processing program included in the content codes. The content codes further include a program or information to be applied for executing startup processing, security check processing, and the like, and the content codes are acquired and executed at the time of content use.

The execution processing of content codes is principally performed by the secure VM which is set by the information processing device for executing reproduction of content. The secure VM serves as a data processing unit for executing content codes, which acquires the content codes including a program or application information to be adapted to use of the encrypted content recorded in the information recording medium, and executes data processing in accordance with the acquired content codes.

Content codes are set as a file independent from the content, and are recorded in an information recording medium.

Accordingly, it becomes possible to perform processing for moving content code alone to another information recording medium, or processing for copying the content code alone. Upon leakage of content codes occurring, circulating in an unauthorized manner, and unauthorized utilization being performed, there is the possibility that many contents will be reproduced in an unauthorized manner and used, causing serious damage. Hereinafter, description will be made regarding a configuration for preventing such unauthorized usage of content codes.

Figure 15:
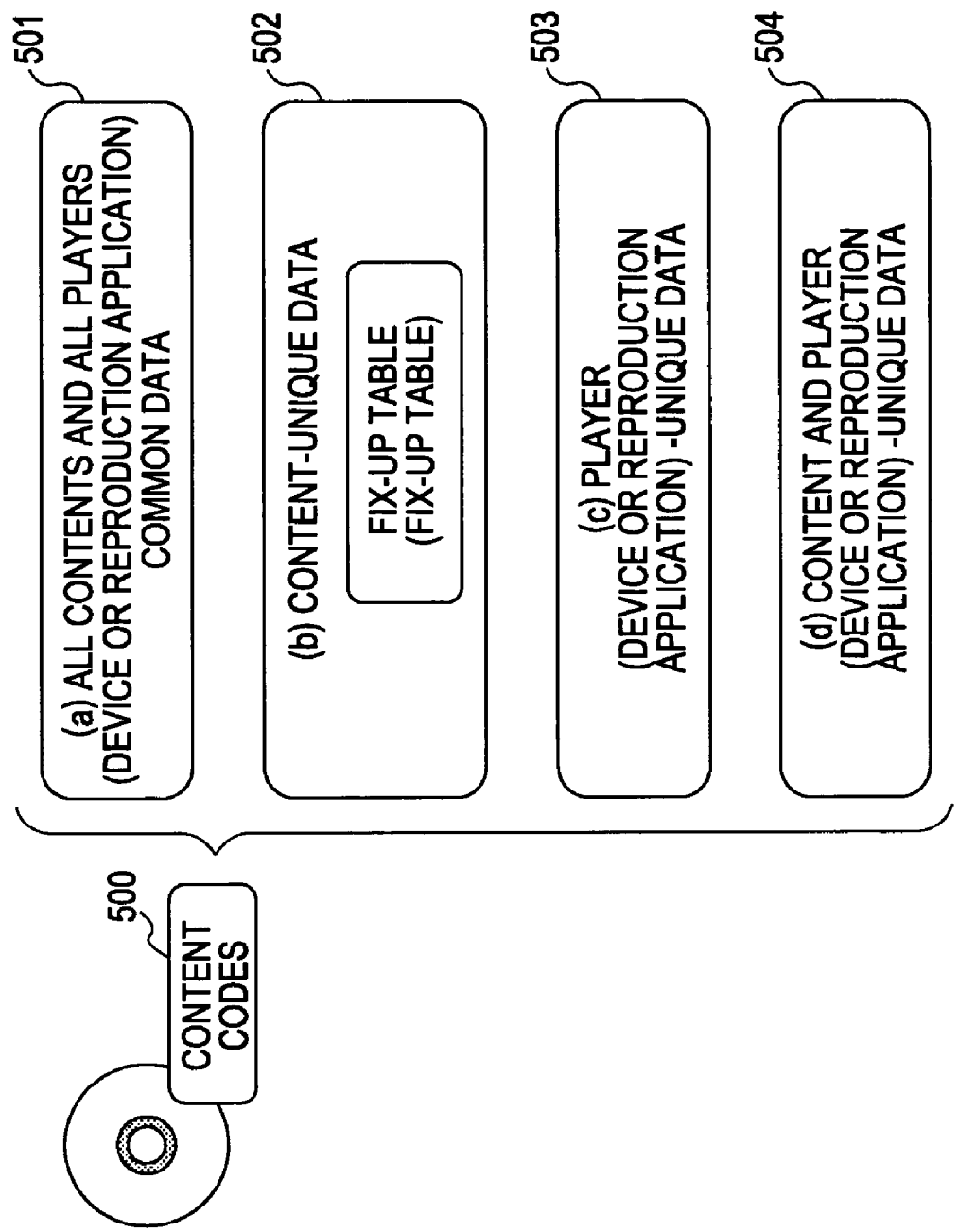
FIG. 15 is a diagram describing the details of the content codes recorded in the information recording medium.

Description will be made regarding the data types included in content codes 500 to be recorded in an information recording medium with reference to FIG. 15. As described above, a program and a fix-up table to be applied to the data transformation processing of content are recorded in the content codes 500. For example, the fix-up table is data including transformation data serving as the replacement data of the configuration data of each content, and needs to be content-unique data, but for example, the transformation processing program or the like is the data which each content can be set as common code information.

Content codes also include information or a program which is set for corresponding to an information processing device for executing content reproduction processing, or a reproduction (player) application to be executed in an information processing device. For example, in the event of using content codes in multiple different manufacturer's information processing devices or reproduction applications, multiple codes corresponding to the respective devices or applications are recorded in the content codes, and each player (device or reproduction application) performs processing by selecting the codes corresponding to its own player (device or reproduction application) from player (device or reproduction application)-unique codes included in the content codes.

Thus, various types of data are included in the content codes 500. Roughly classifying this data yields four classifications, as shown in FIG. 15. That is to say, (a) All contents and all players (device or reproduction application) common data 501

(b) Content-unique data 502

(c) Player (device or reproduction application)-unique data 503

(d) Content and player (device or reproduction application)-unique data 504

Hereinafter, description will be made regarding the specific data content of each data.

(a) All Contents and All Players (Device or Reproduction Application) Common Data 501

All contents and all players (device or reproduction application) common data 501 is a data portion including information or a program which all of the information processing devices or reproduction applications can use commonly, and specifically, for example, which includes the following information and programs.

(a1) Program relating to a startup routine: for example, a program for executing processing such as checking of a memory initialization status, reading of data which is insufficient at a first loading, confirmation regarding whether or not content recorded in an information recording medium (Disc) together is an authorized content, or the like.

(a2) Common routine (access to external recording etc.) program: for example, a program which can be used using a nonvolatile memory access function. In the event that the information which the content codes of this program can use is recorded, data can be read and used.

(a3) Player identification routine: a program for acquiring information of an device or reproduction application which currently performs reproduction, and determining regarding whether or not this is a target for an additional security check. In the event that an additional check is necessary, a content code file is loaded as necessary, following which the additional check is performed.

(b) Content-unique Data 502

The content-unique data 502 is a data portion including-unique information or program in each content, and specifically, for example, includes the following information and programs.

(b1) Fix-up table (FixUpTable) information: the fix-up table including the transformation data described in the above processing example. This includes not only the transformation data, but information necessary for data transformation processing such as a secret (SP) parameter calculation routine, and the like.

(b2) Title initializing program: with a security check to be performed prior to processing for generating the fix-up table (FixUpTable), and prior to reproduction of a title, a routine relating to a check depending on only content is included.

(c) Player (Device or Reproduction Application)-unique Data 503

(c) Player (device or reproduction application)-unique data 503 is a data portion including information or a program unique to an information processing device or reproduction application for playing back content, and specifically, for example, includes the following information and programs:

(c1) RunNative execution portion, NativeCode: information and programs for executing processing unique to an device or application for executing reproduction of content, and executing functions to make detection or improvement of a security issue. The processing performed by a kernel mode in the operating system of an information processing device for executing reproduction processing is common. Also, when executing this processing, detection or improvement of a security issue due to execution of these content codes is made on the information processing device side for executing reproduction of content by including the validity verification function (e.g., signature using a secret key (PrivateKey) as to a public key assigned to a player manufacturer. In other words, a player device (application program) has a public key corresponding to a secret key assigned to by the manufacturer in the NativeCode thereof, and a signature using this secret key is provided, and signature verification is performed using the correlating public key.) unique to a player in the NativeCode itself following validity verification using signature verification being executed.

(d) Content and Player (Device or Reproduction Application)-unique Data 503

The content and player (device or reproduction application)-unique data 503 is data including information or a program unique to content, and also unique to an information processing device or reproduction application for playing back content, and specifically, for example, includes the following information and programs.

(d1) Player validity check portion using DiscoveryRAM: information and programs for executing a function to check regarding whether to be an authorized player (device or reproduction application) by checking a specific value on the memory (RAM) within an device for executing reproduction of content. Correctness is confirmed by monitoring that specific memory enters a player-unique state during reproduction of a specific content. In this case, the check routine depends on both the content and the player.

(d2) Comparison data for DiscoveryRAM: the table storing values for comparing with the actual values on the RAM (target values) in the above (d1) player validity check using DiscoveryRAM.

Thus, content codes store various types of information and program, a device for executing reproduction of content selects the corresponding code information depending on a reproduction content or depending on a device or application from these content codes, and executes various types of processing.

As described with reference to FIG. 15, content codes can be classified into the following four categories:

(a) All contents and all players (device or reproduction application) common data 501

(b) Content-unique data 502

(c) Player (device or reproduction application)-unique data 503

(d) Content and player (device or reproduction application)-unique data 504

These respective of content codes are stored in an information recording medium as an individual file or an accumulated file. The content codes of these respective categories may differ in an entity which produces codes, respectively. For example, the content codes corresponding to (b) content-unique data are set by a studio serving as a content producer. Also, (c) player (device or reproduction application)-unique data is frequently generated by an entity for producing a reproduction device or reproduction application serving as a player.

Figure 16:
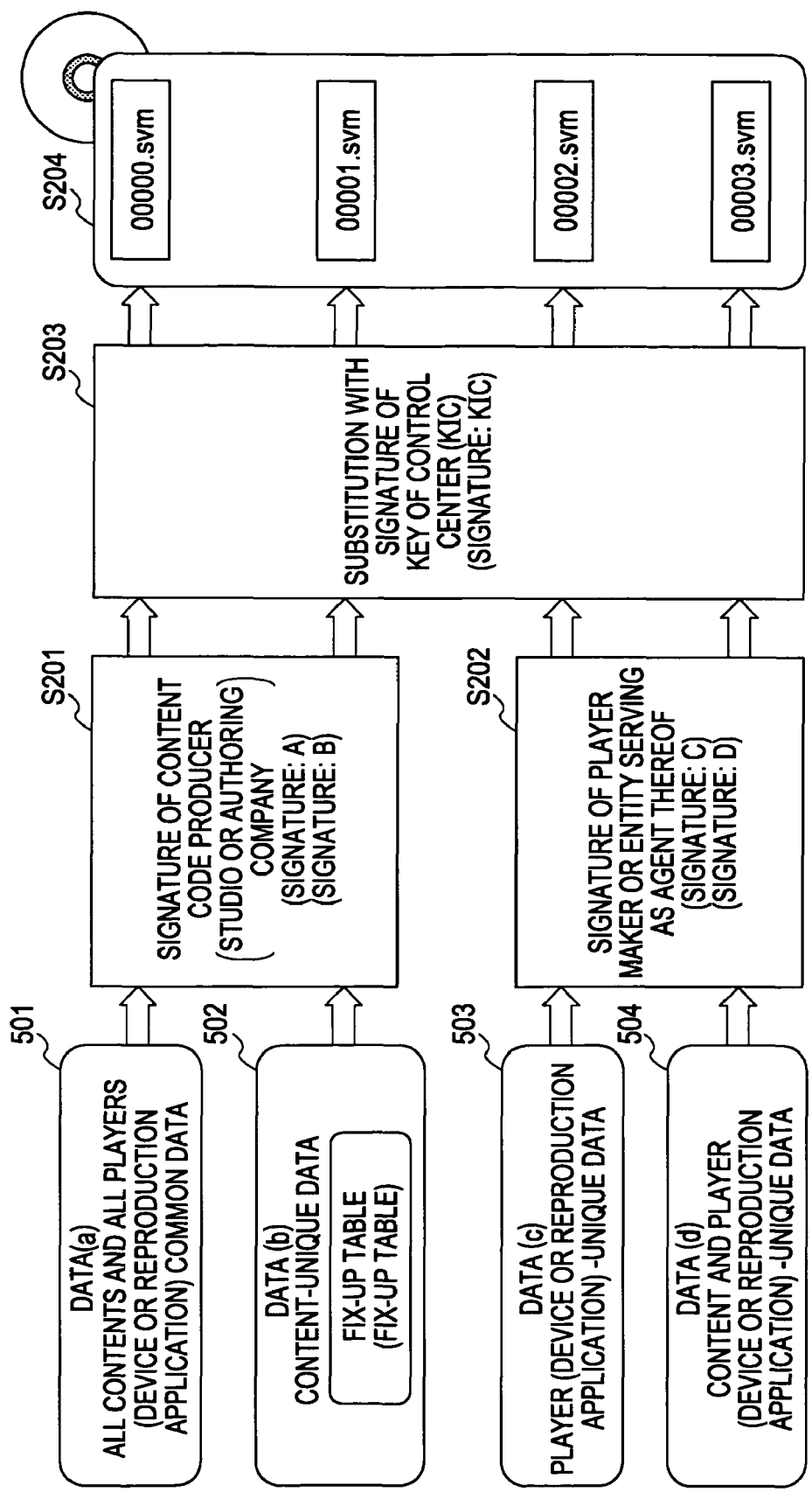
FIG. 16 is a diagram describing the details of the processes for generating and recording the content codes recorded in the information recording medium.

Description will be made with reference to FIG. 16 regarding a sequence which goes up to the point that content codes thus generated by a different entity are recorded in an information recording medium. FIG. 16 illustrates the configuration data of the content codes corresponding to the above four categories. That is to say, these are content codes having one of the following four different categories:

(DATA a) All contents and all players (device or reproduction application) common data 501

(DATA b) Content-unique data 502

(DATA c) Player (device or reproduction application)-unique data 503

(DATA d) Content and player (device or reproduction application)-unique data 504

These content codes are produced by a different entity, i.e., a studio which performs production and edition of contents, an authoring company, a player (device or reproduction application) manufacturer, or the like.

Upon these content codes being produced, the signature of the producer or presentation entity of each content codes is appended in steps S201 and S202. The digital signature is appended by applying the encryption key (secret key) possessed by each entity. Appending of this digital signature is set for tampering verification and tampering prevention of each content codes. Note that in the drawing, only two processing blocks of steps S201 and S202 are illustrated, but each entity which produces each content codes appends its signature depending on the number of content codes to be produced.

In step S203, the control center (KIC) eventually appends its digital signature to the content codes to be recorded in the information recording medium. Note that when setting a digital signature in this control center (KIC: may also be called a Key Issuance Center, however in the present specification this is called a control center), a new digital signature of the control center (KIC) is preferably set on the condition that the digital verification of each entity has been performed, and each content codes has been confirmed not to be subjected to tampering.

The content code file to which the digital signature of the control center (KIC) is appended is recorded in the information recording medium. As for the setting mode of a signature corresponding to the content codes to be recorded in the information recording medium, several different setting modes are available. Description will be made regarding the data configuration of the content codes to be recorded in the information recording medium, and a signature setting example with reference to FIGS. 17 through 20.

Figure 17:
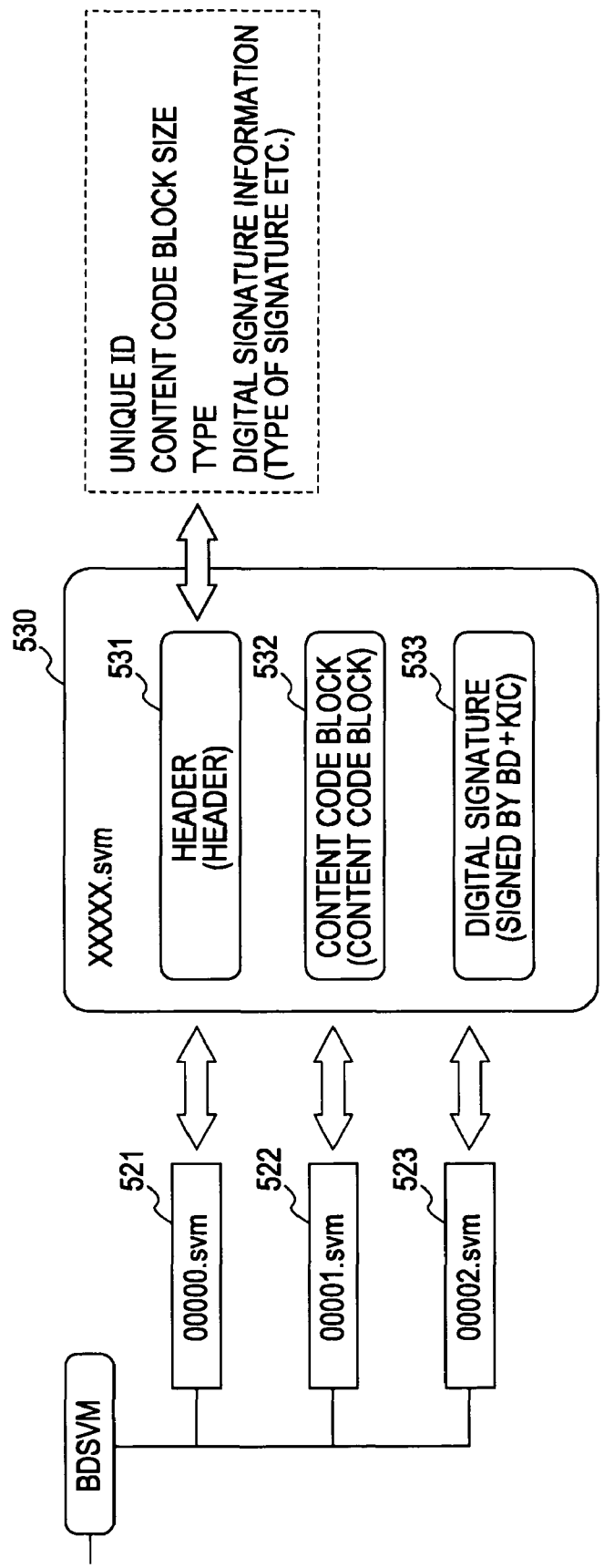
FIG. 17 is a diagram describing a data configuration example of content code files to be recorded in the information recording medium.

The example shown in FIG. 17 is an example wherein each of content code files [xxxxx.svm] 521, 522, and 523, recorded in the information recording medium, has a common file configuration, and each file, as shown in the content code file 530 in the drawing, includes a header 531, a content code block 532, and a digital signature 533.

The header 531 includes digital signature information such as a unique ID serving as the unique identification information corresponding to content codes, the data size of a content code block which stores the entity data of the content codes, the type of digital signature (such as ECDSA), and the like.

The content code block 532 records the above various types of content codes as the entity data of content codes. The digital signature 533 is, in the present example, the signature of the control center. With the present example, let us say that the signature of each entity other than the above-described control center is not included in the content codes.

Thus, with the arrangement wherein the signature of the control center is set to all of the content code files, all of the content code files [xxxxx.svm] are set to 2MB+header+signature in data capacity. 2 MB is applied to the content code block.

An information processing device (user device) which uses the content codes shown in FIG. 17 executes the digital signature verification of the control center included in the content codes, verifies regarding whether or not the content codes have been tampered, following which uses the codes. Description will be made later regarding a specific processing sequence.

Figure 18:
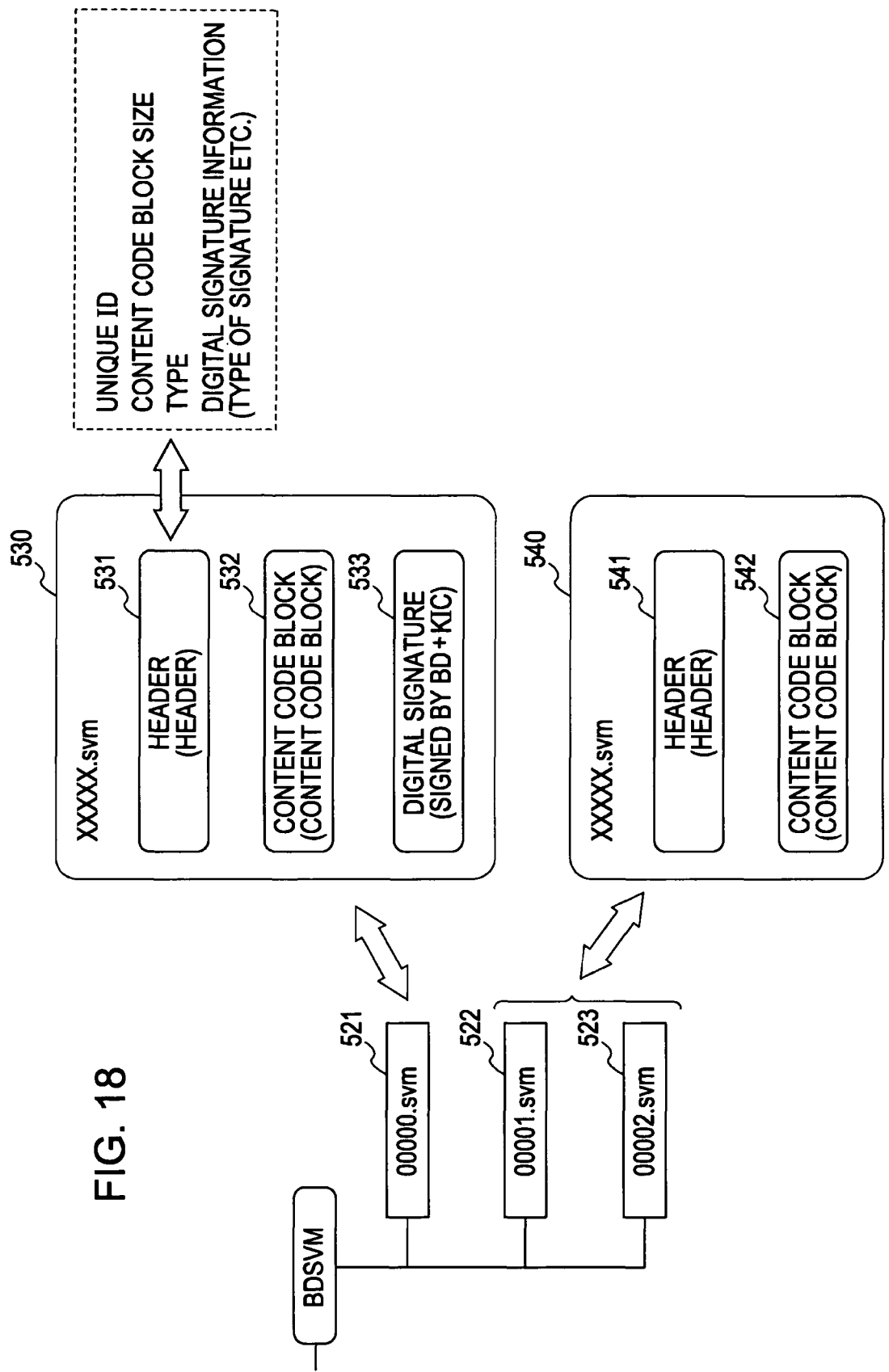
FIG. 18 is a diagram describing a data configuration example of content code files to be recorded in the information recording medium.

FIG. 18 is an arrangement example wherein a signature is set to only one of the content code files to be recorded in the information recording medium, and no signature is set to the other content code files. With the example shown in FIG. 18, an arrangement is made wherein the digital signature 533 of the control center is set to only the content code file [00000.svm] 521 as shown in the file 530 which includes the header 531, the content code block 532, and the digital signature 533 of the control center, but the digital signature of the control center is not set to the file 540 of the other content code file [00001.svm] 522 and so on, which are set as the file 540 in which only the header 541 and content code block 542 are stored.

The content code file to which the digital signature of the control center is set is preferably a file which stores the content codes to be executed in a sure manner at the information processing device, such as a file in which the content codes for executing a startup routine is recorded.

With this arrangement example, the information processing device, which uses content codes, executes signature verification only in the case of using the content code file [00000.svm] 521. In the case of using the other files, signature verification can be omitted. However, let us say that an arrangement is made wherein tampering verification of each content code file in which the signature is not set is executed using a method different from digital signature verification, e.g., a simple method such as hash verification or the like, validity is confirmed, following which the codes of each file are used. In this case, for example, an arrangement is made wherein a hash value for collation to be applied to verification is recorded and retained in a content code file. Description will be made later regarding these processing sequences.

Thus, with the arrangement wherein the signature of the control center is set to only one of the content code files, the content code file to which the signature is set, for example, is set to 2MB+header+signature in data capacity, but the other content code files to which the signature is not set have no appending of the signature, and it becomes unnecessary to take the process of signature verification into consideration, so it also becomes unnecessary to prepare a restraint in the size of the content code block, and accordingly, files to which the content code block of an arbitrary size is set can be employed as the other content code files.

Next, description will be made regarding a setting example of the content code file in which not only the signature of the control center but also the signature of production or presentation entity of each content codes are recorded with reference to FIGS. 19 and 20.

Figure 19:
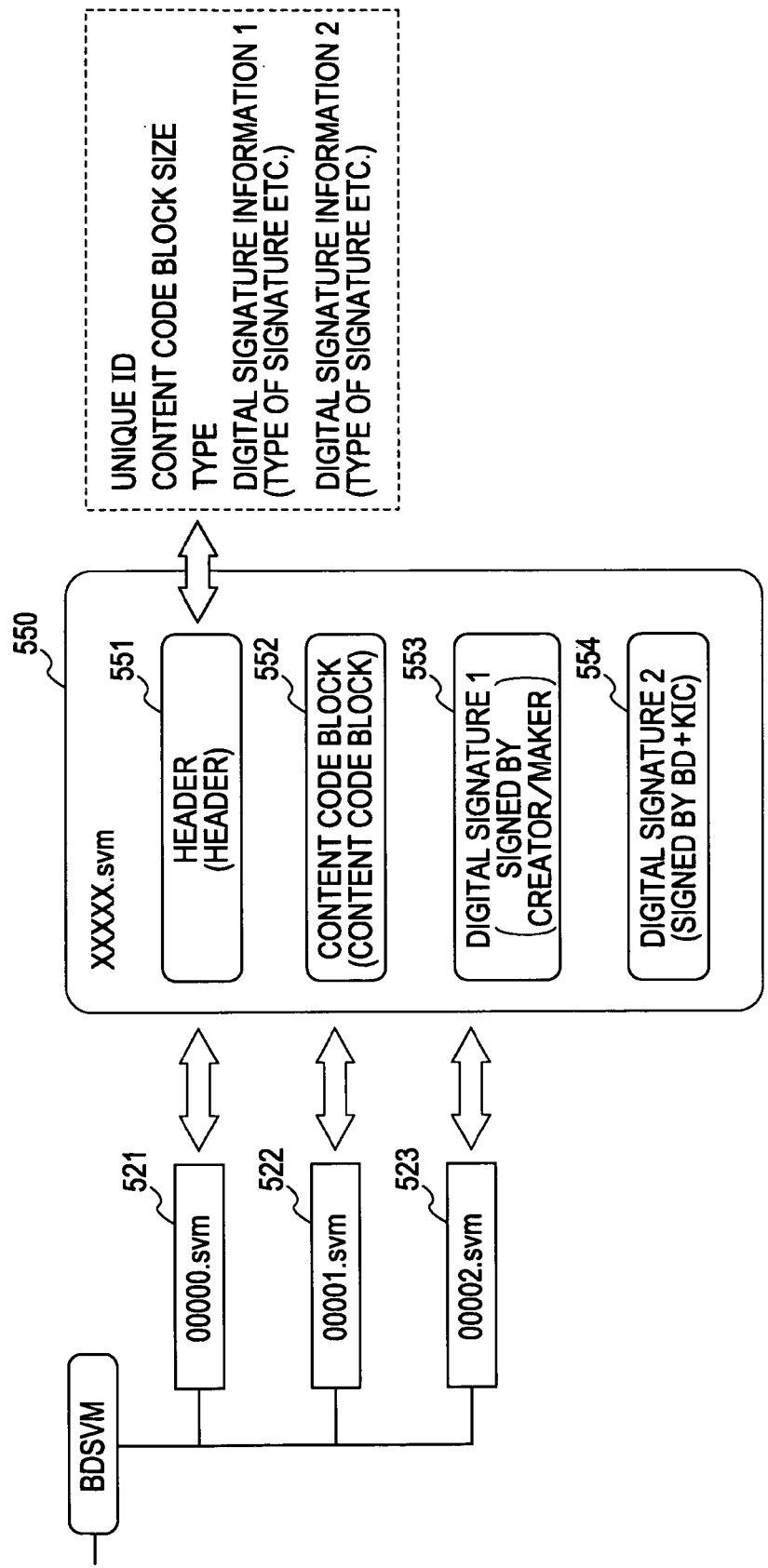
FIG. 19 is a diagram describing a data configuration example of content code files to be recorded in the information recording medium.

The example shown in FIG. 19 is an example wherein each of content code files [xxxxx.svm] 521, 522, and 523 has the common file configuration, and each file, as shown in the content code file 550 in the drawing, includes a header 551, a content code block 552, a digital signature 1, 553, and a digital signature 2, 554.

The header 551 includes digital signature information such as a unique ID serving as the unique identification information corresponding to content codes, the data size of a content code block which stores the entity data of the content codes, the type of digital signature (such as ECDSA), and the like. The content code block 552 records the above various types of content codes as the entity data of content codes.

The digital signature 1, 553 is the signature of the producer or presentation entity of content codes to be stored in each content code file. The digital signature 2, 554 is the signature of the control center. With the present example, in addition to the signature of the control center, the signature of each entity is also set to be stored.

An information processing device (user device) which uses the content codes shown in FIG. 19 executes verification only regarding the digital signature of the control center included in the content codes, verifies regarding whether or not the content codes have been tampered, following which uses the codes. Alternatively, an arrangement may be made wherein in addition to verification of the digital signature of the control center, verification of the digital signature of each entity is executed.

Figure 20:
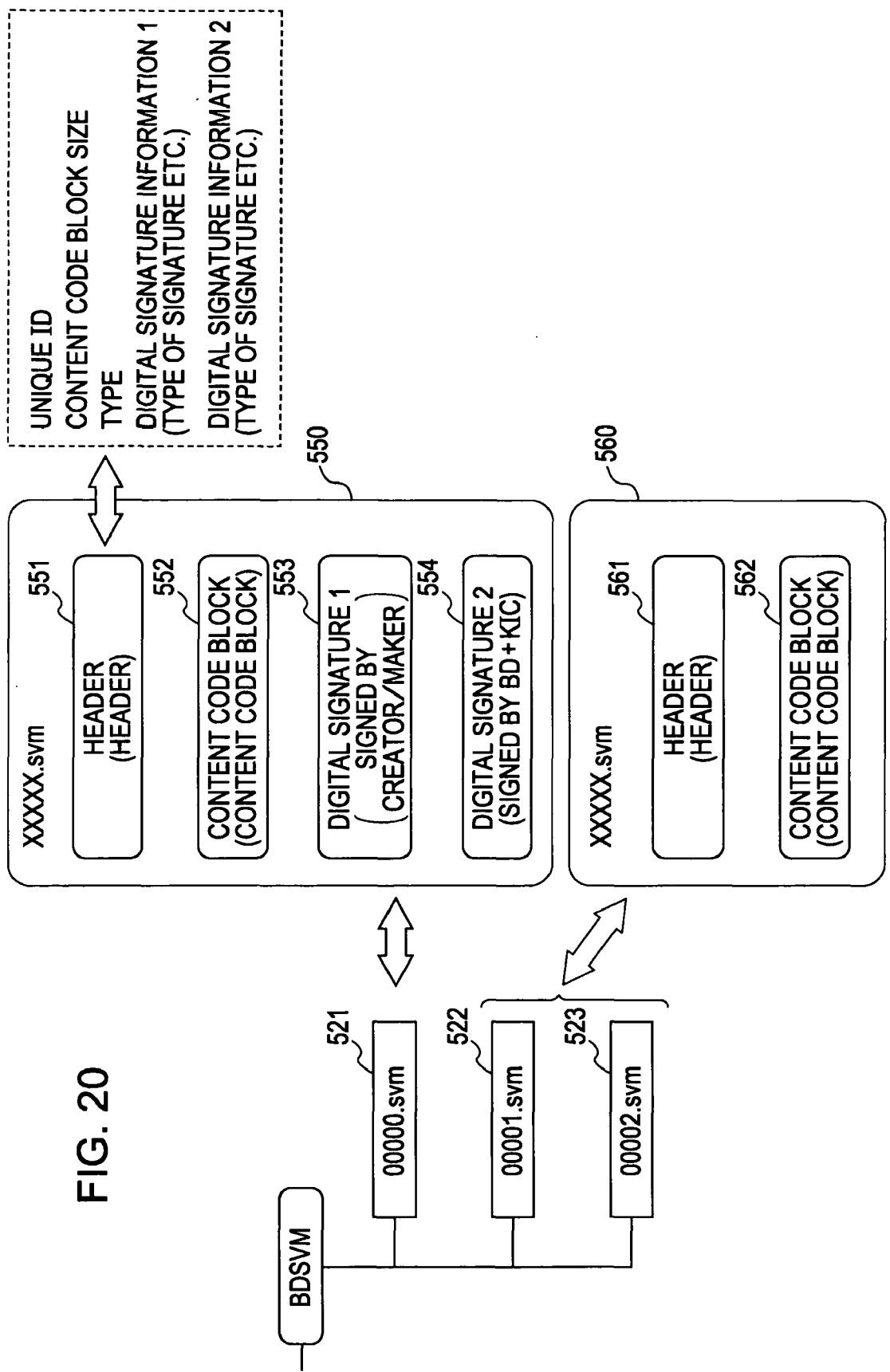
FIG. 20 is a diagram describing a data configuration example of content code files to be recorded in the information recording medium.

FIG. 20 is an arrangement example wherein a signature is set to only one of the content code files to be recorded in an information recording medium, and set no signature to the other content code files. With the example shown in FIG. 20, an arrangement is made wherein the digital signature 553 of a producer or presentation entity of the content codes, and the digital signature 554 of the control center are set to only the content code file [00000.svm] 521 as shown in the file 550 which includes the header 551, the content code block 552, the digital signature 1, 553, and the digital signature 2, 554, but the digital signature is not set to the file 560 of the other content code file [00001.svm] 522 and so on, which are set as the file 540 in which only the header 561 and content code block 562 are stored.

The content code file to which the digital signature is set is preferably a file which stores the content codes to be executed in a sure manner at the information processing device, for example, such as a file in which the content codes for executing a startup routine is recorded, as with the example previously described with reference to FIG. 18.

With this arrangement example, the information processing device, which uses content codes, executes signature verification only in the case of using the content code file [00000.svm] 521. In the case of using the other files, signature verification can be omitted. However, let us say that an arrangement is made wherein tampering verification of each content code file in which the signature is not set is executed using a method different from digital signature verification, e.g., a simple method such as hash verification or the like, validity is confirmed, following which the codes of each file are used. In this case, for example, let us say that an arrangement is made wherein a hash value for collation to be applied to verification is recorded and retained in a content code file.

Next, description will be made regarding the processing sequence of usage of content codes in the information processing device for executing data processing using content codes with reference to the flowcharts shown FIGS. 21 and 22.

Figure 21:
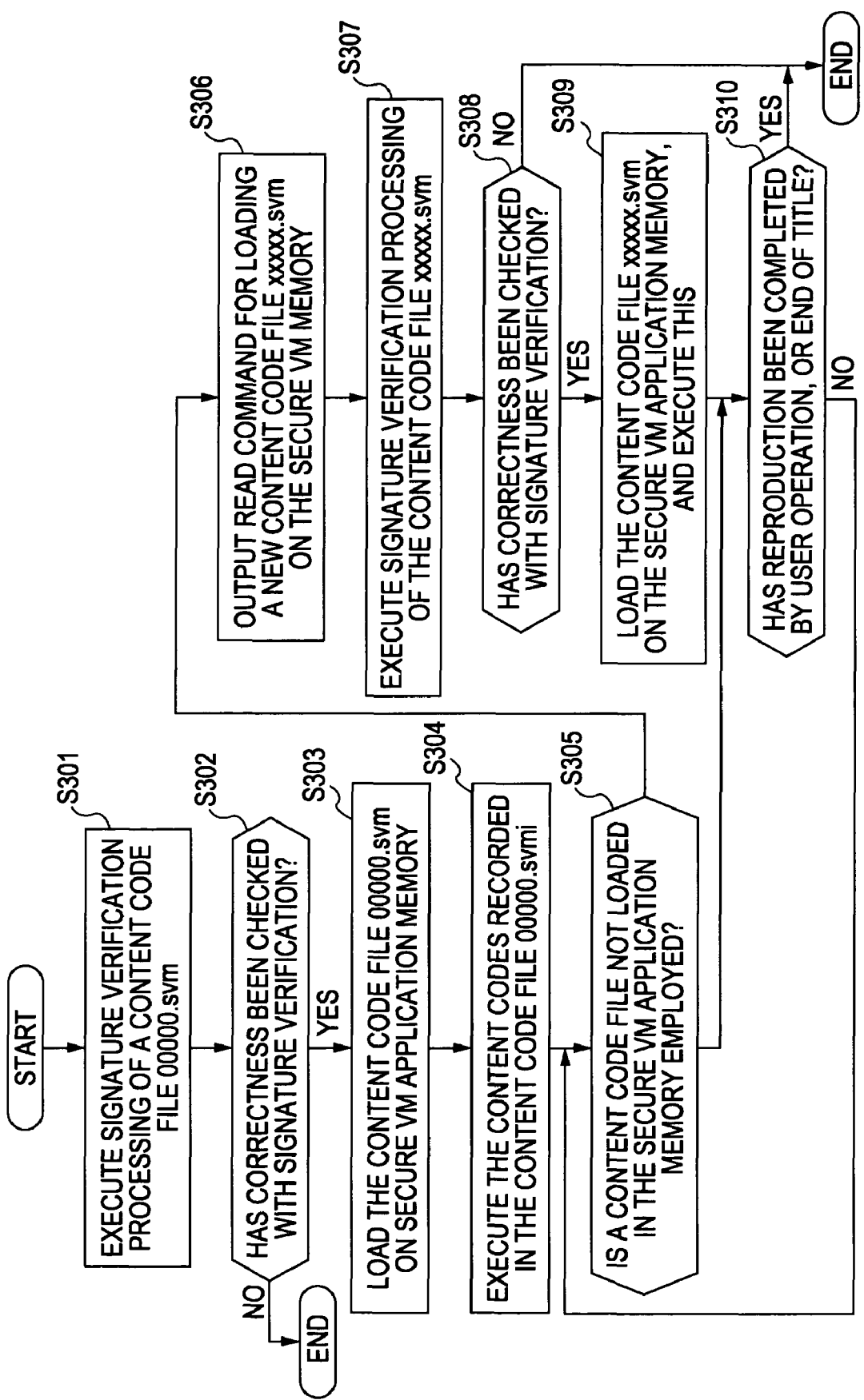
FIG. 21 is a diagram illustrating a flowchart describing the usage sequence of content codes recorded in the information recording medium.
Figure 22:
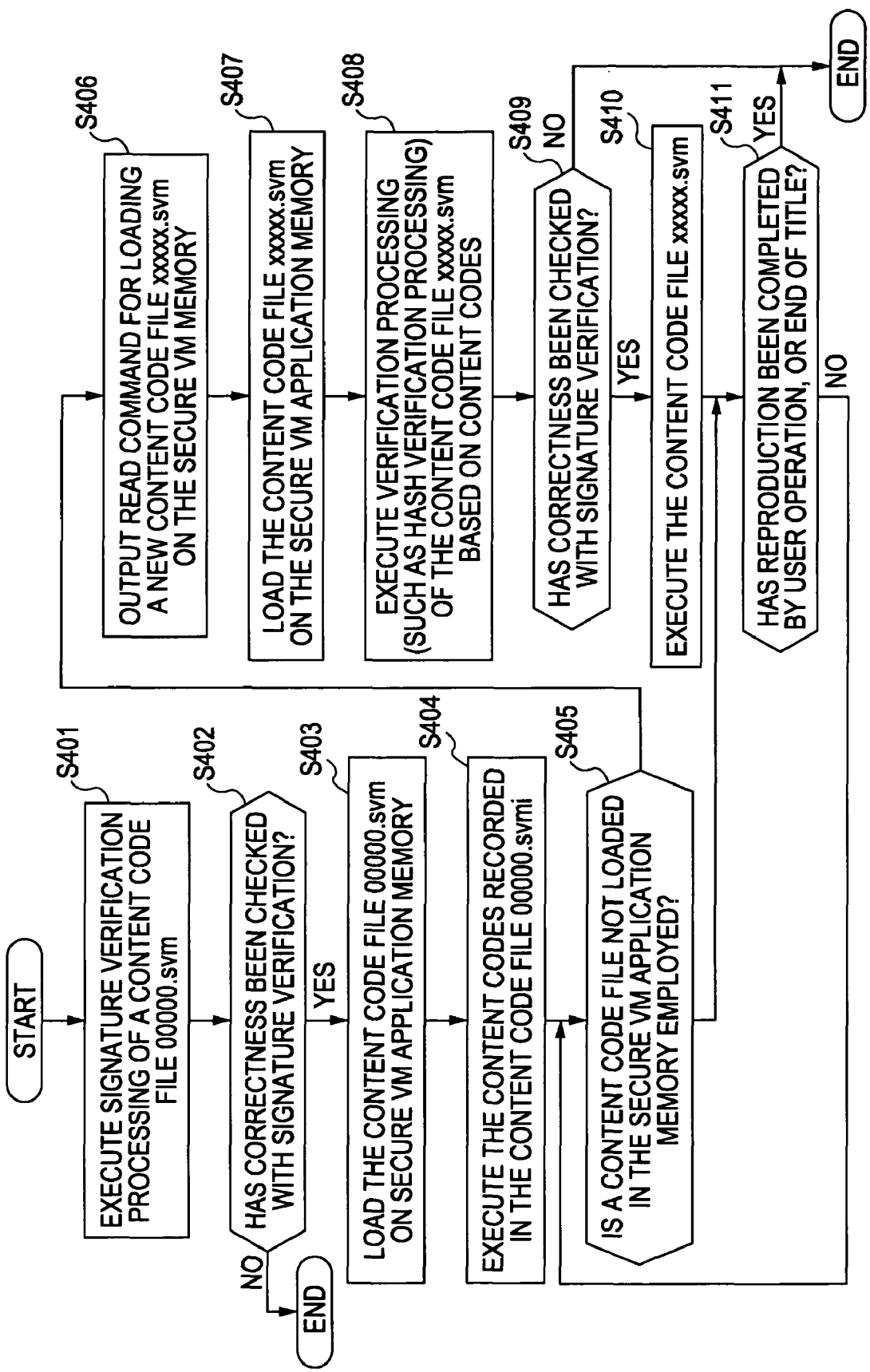
FIG. 22 is a diagram illustrating a flowchart describing the usage sequence of content codes recorded in the information recording medium.

FIG. 21 is a flowchart illustrating the processing sequence in the case of the content code file configurations previously described with reference to FIGS. 17 and 19, i.e., in the case of file setting wherein the digital signature is set to all the content code files, and FIG. 22 is a flowchart illustrating the processing sequence in the case of the content code file configurations previously described with reference to FIGS. 18 and 20, i.e., in the case of file setting wherein the digital signature is set to only the one content code file.

First, description will be made regarding the sequence of usage of content codes in the case of file setting wherein the digital signature is set to all the content code files with reference to the flowcharts shown FIG. 21. Note that this processing sequence is executed by the secure VM which is set by the information processing device for executing reproduction of content. The secure VM serves as a data processing unit for acquiring the content codes including a program or application information to be adapted to usage of the encrypted content recorded in the information recording medium, and executing data processing in accordance with the acquired content codes.

First, the data processing unit (secure VM) of the information processing device which uses content codes executes the signature verification processing of the content code file [00000.svm] in step S301. The secure VM executes verification of the digital signature of the control center (KIC) set to the content code file [00000.svm]. Specifically, the secure VM executes, for example, digital signature verification to which the public key of the control center (KIC) is applied (e.g., ECDSA signature verification algorithm).

In step S302, the event that determination is made with the signature verification that the content code file has no validity, usage of the content codes is suspended, and then the processing ends.

In the event that determination is made with signature verification in step S302 that the content code file has validity, the flow proceeds to step S303, where the content code file [00000.svm] read out from the information recording medium is loaded in the memory region where the secure VM uses, and in step S304, the content codes recorded in the content code file [00000.svm] are executed. Note that the content codes recorded in this content code file [00000.svm] are, for example, the execution codes of a startup routine, and the information processing device, which uses the content stored in the information recording medium, first performs processing in the sequence of the verification processing, load processing, and code execution processing of the content code file [00000.svm].

Subsequently, determination is made in step S305 regarding whether or not usage of the content code file not loaded in the adaptation memory of the secure VM is required, and in the event of being required, the flow proceeds to step S306, where a read command for loading a new content code file [xxxxx.svm] on the memory of the secure VM is output to the drive.

Next, in step S307, the secure VM executes verification of the digital signature of the control center (KIC) set to the content code file [xxxxx.svm]. In step S308, in the event that determination is made with the signature verification that the content code file has no validity, usage of the content codes is suspended, and then the processing ends.

In step S308, in the event that determination is made with the signature verification that the content code file has validity, the flow proceeds to step S309, where the secure VM loads the content code file [xxxxx.svm] read out from the information recording medium in the memory region which the secure VM uses, and executes this.

In step S310, in the event that end of reproduction by user operations or end of title has not occurred, the flow returns to the determination processing regarding necessity of usage and load of another content codes in step S305. In step S310, in the event that end of reproduction by user operations or end of title has occurred, the processing ends.

Next, with reference to the flowchart shown in FIG. 22, description will be made regarding the sequence of usage of content codes in the case of the content code file setting previously described with reference to FIGS. 18 and 20, i.e., in the case of file setting wherein the digital signature is set to only the one content code file, and the digital signature is not set to the other content code files. Note that this processing sequence is executed by the secure VM which is set by the information processing device for executing reproduction of content.

First, the information processing device which uses content codes executes the signature verification processing of the content code file [00000.svm] in step S401. The information processing device executes verification of the digital signature of the control center (KIC) set to the content code file [00000.svm]. Specifically, the information processing device executes, for example, digital signature verification to which the public key of the control center (KIC) is applied (e.g., ECDSA signature verification algorithm).

In step S402, in the event that determination is made with the signature verification that the content code file has no validity, usage of the content codes is suspended, and then the processing ends.

In the event that determination is made with signature verification in step S402 that the content code file has validity, the flow proceeds to step S403, where the content code file [00000.svm] read out from the information recording medium is loaded in the memory region where the secure VM uses, and in step S404, the content codes recorded in the content code file [00000.svm] are executed. Note that the content codes recorded in this content code file [00000.svm] are, for example, the execution codes of a startup routine, and the information processing device, which uses the content stored in the information recording medium, first performs processing in the sequence of the verification processing, load processing, and code execution processing of the content code file [00000.svm].

Subsequently, determination is made in step S405 regarding whether or not usage of the content code file not loaded in the adaptation memory of the secure VM is required, and in the event of being required, the flow proceeds to step S406, where a read command for loading a new content code file [xxxxx.svm] on the memory of the secure VM is output to the drive.

Next, in step S407, the information processing device loads the content code file [xxxxx.svm] read out from the information recording medium in the memory which the secure VM uses.

Next, in step S408, the information processing device executes verification of the content code file by calculating the hash value based on the content code configuration data stored in the content code file [xxxxx.svm], and executing collation processing as to the hash value for verification which was stored in the content code file [xxxxx.svm] beforehand. In step S409, in the event that determination is made with the verification that the content code file has no validity, usage of the content codes is suspended, and then the processing ends.

In step S409, in the event that confirmation is made with the verification that the content code file has validity, the flow proceeds to step S410, where the information processing device executes the content codes acquired from the content code file [xxxxx.svm].

In step S411, in the event that end of reproduction by user operations or end of title has not occurred, the flow returns to the determination processing regarding necessity of usage and load of another content codes in step S405. In step S411, in the event that end of reproduction by user operations or end of title has occurred, the processing ends.

Thus, the information processing device is configured such that, when using content codes, verification of the digital signature set to a content code file is executed, or the hash verification is executed to confirm the validity of the content code file, following which the processing of the content codes is executed, thereby preventing unauthorized codes from being executed.

The content codes produced by each entity can be set as an independent data file, and such a content code file can be recycled. In other words, such a content code file can be commonly used as to different contents or different players (devices or reproduction applications) in some cases. Description will be made regarding the recycle configuration of such content codes with reference to FIG. 23.

Figure 23:
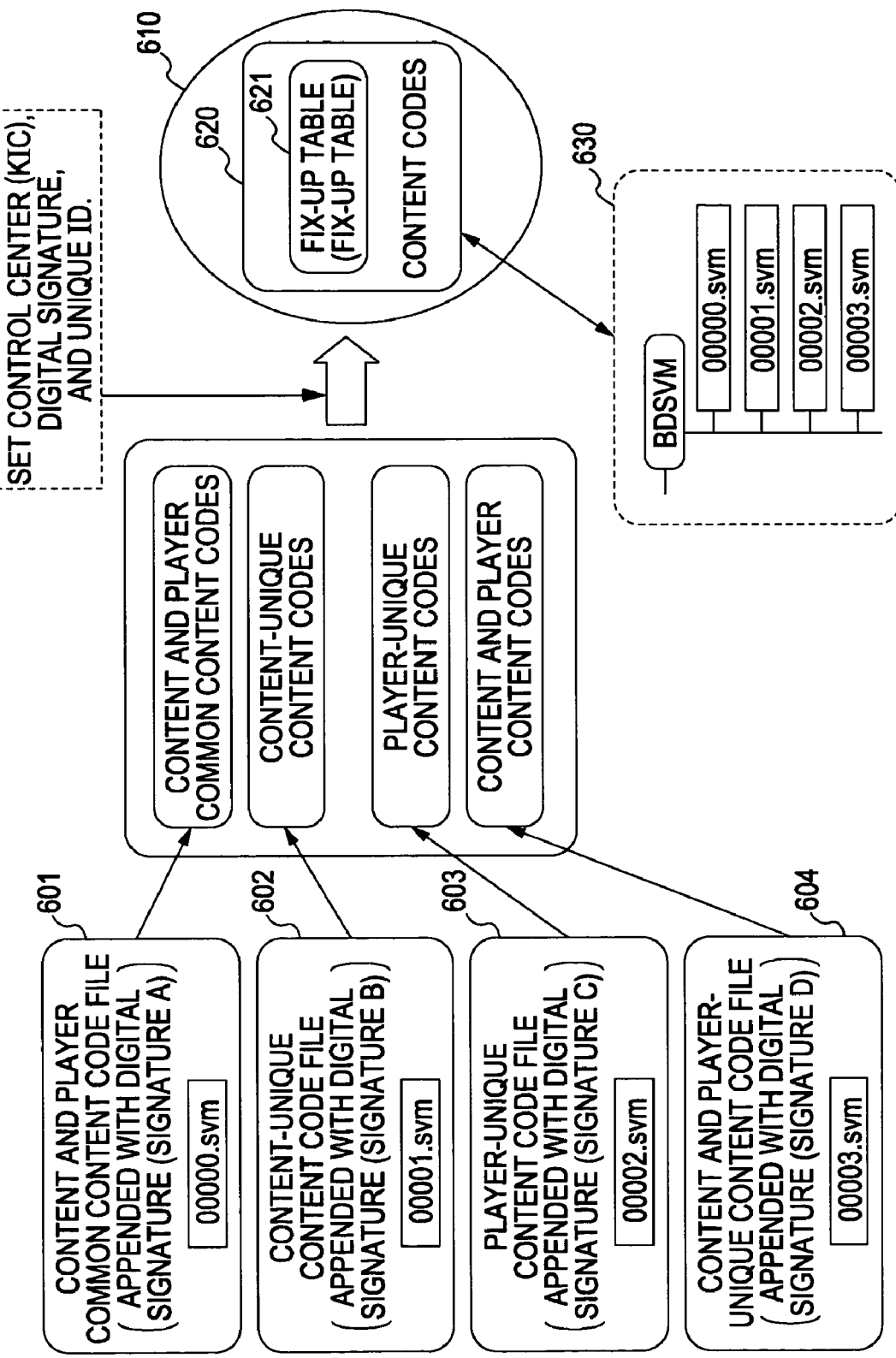
FIG. 23 is a diagram describing a usage example of content codes.
Figure 24:
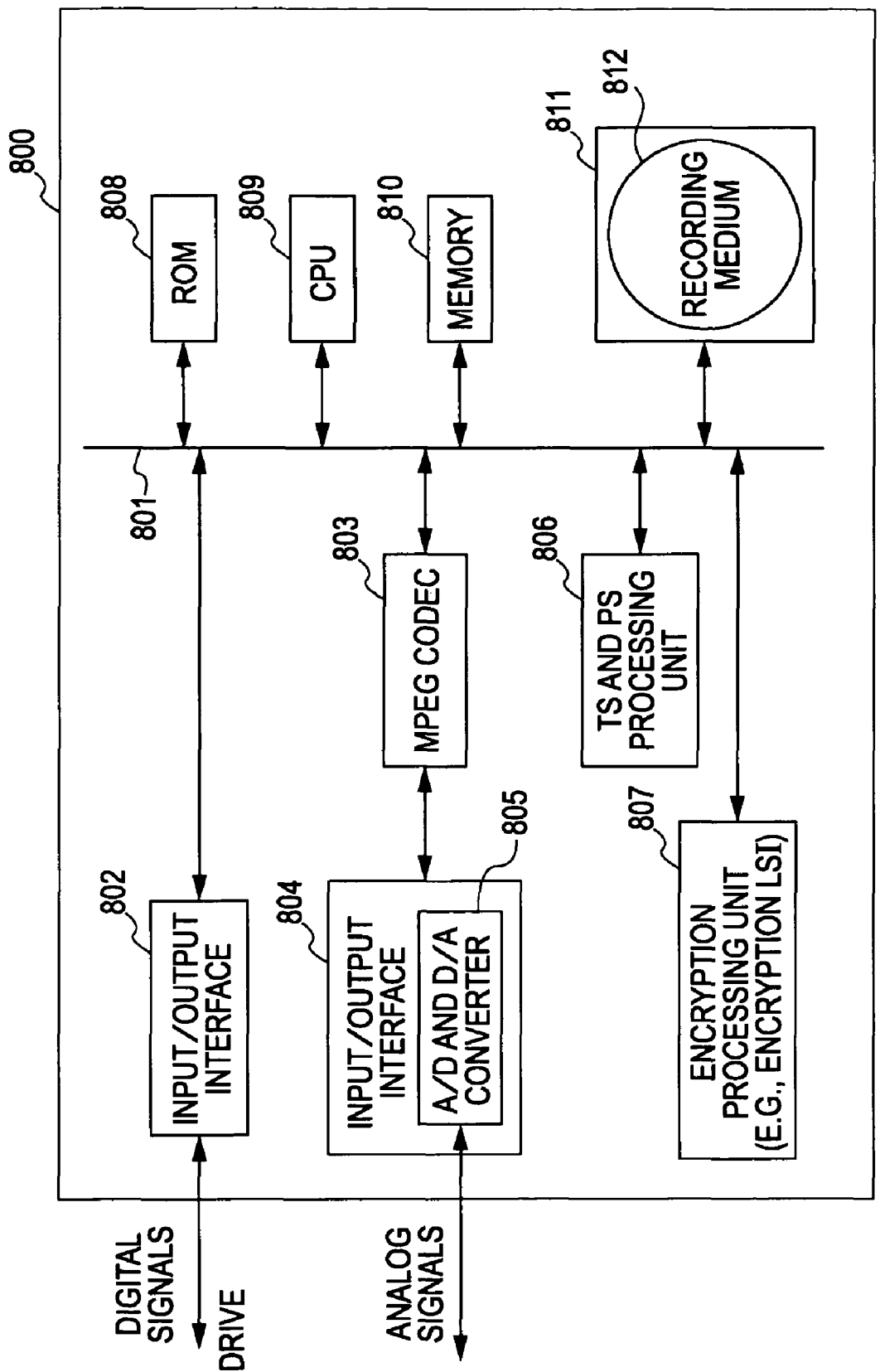
FIG. 24 is a diagram describing a hardware configuration example of the information processing device.

In FIG. 23, for example, the content code files 601 through 604 are content code files retained by respective content code production or presentation entities, and represent:

content and player common content code file [00000.svm] 601,
content-unique content code file [00001.svm] 602,
player-unique content code file [00002.svm] 603, and
content and player-unique content code file [00003.svm] 604, respectively.

The digital signature of each content code production entity or presentation entity is appended to these content code files 601 through 604 each of which is kept in each entity.

In the event of producing an information recording medium in which a new content is recorded, each entity can recycle these content code files 601 through 604 which have been already used in another content recording information recording medium.

As previously described with reference to FIG. 16, these are provided to the control center, and the digital signature is set to these at the control center, and then these are stored in an information recording medium 610. The digital signature by the control center (KIC), and the unique ID set by the control center are appended to the content codes to be recorded in the information recording medium 610. The content codes 620 to be recorded in the information recording medium 610 includes a fix-up table 621, as shown in the drawing. A specific directory configuration, as shown in a directory configuration 630, is set as a configuration wherein the content codes generated by each entity are individually set.

Thus, the content codes can be recycled according to various types of content, the content codes necessary for modification and the content codes which can be recycled are combined depending on each content as appropriate to be recorded in the information recording medium.

8. Configuration of Information Processing Device

Next, the hardware configuration example of an information processing device which executes the processing of the above-described in reproduction (player) application and secure VM will be described with reference to FIG. 31. An information processing device 800 has the CPU 809 which executes data processing following various types of program including OS, content reproduction and recording application programs, and programs for mutual authentication processing, processing and accompanying the reproduction of contents, e.g., the above-described data transformation processing, and so forth from 880 serving as a storage area for programs, parameters, etc., memory 810, and input/output I/F 802 for input/output of digital signals, an input/output I/F 804 having an A/D, D/A converter 805 for input/output of analog signals, an MPEG CODEC 803 for executing encoding and decoding processing of MPEG data, TS-PS processing means 806 for executing the TS (Transport stream)-PS (Program Stream) processing, encryption processing means 807 for executing the various types of encryption processing, such as mutual authentication decryption processing of encrypted content, and so forth, a recording medium 812 such as a hard disk, and a drive 8114 driving the recording medium 812 and performed input/output of data recording/reproducing signals, with each block being connected to a bus 801.

The information processing device (host) 800 is connected with the drive by connecting bus such as a ATAPI-BUS, for example. Fix-up tables, content, and so forth, are input/output via the digital signal input/output I/F 802. Encryption processing and decryption processing is performed by the encryption processing means 807, applying AES algorithms, or the like, for example.

Note that programs for executing content reproduction or recording processing are kept inside the ROM 808 for example, and the memory 810 is used while executing the programs as necessary, for work area for keeping the parameters and data.

The ROM 808 or recording medium 812 stores, for example, the public key of an Administration Center, a secret key for a host, a public key certificate for the host, and further, a drive CRL serving as a revocation list, and so forth.

At the time of reproducing or external output of content, data transformation processing programs obtained from the information recording medium is applied to execute processing following the various processing sequences described earlier in the processing example, such as decryption of encrypted contents, restoration of fix-up tables, writing of transformation data based on data stored in fix-up tables, and so forth.

9. Information Recording Media Manufacturing Device and Information Recording Medium An information recording media manufacturing device and the information recording medium will be described. That is to say, description will be made regarding the manufacturing device of the information recording medium applied to the above-described content reproduction processing, the method thereof, and information recording medium.

The information recording media manufacturing device is, for example, a device for manufacturing the information recording medium 100 storing the recorded data described with reference to FIG. 1 earlier, for example. An information recording medium manufacturing device, as shown in FIG. 25, includes content file generating means 901 for generating a content file storing content data to be recorded in an information recording medium, content code file generating means 902 for storing content codes including a program or application information to be applied to usage of content, and further generating a content code file including data for tampering verification, and recording means 903 for recording the content file generated in the content file generating means 901, and the content code file generated in the content code file generating means 902 in the information recording medium.

The content code file generating means 902 generate a file storing the digital signature based on the data including the content codes included in a content code file, or the hash value based on the data including the content codes included in a content code file as data for tampering verification to be stored in a content code file.

Also, the content code file generating means 902 generate multiple content code files storing content codes which are sectioned into multiple different categories. The four categories previously described with reference to FIG. 15 are employed, for example. The recording means 903 execute processing for recording the content code files of these multiple different categories in the information recording medium.

Note that in the event of generating multiple content code files which stored content codes to be sectioned into multiple different categories, of the files to be generated, the content code file generating means 902 execute processing for generating all of the files each of which stores a digital signature, or only one file as a content code file including digital signature data. As for a file configuration, the file configurations previously described with reference to FIGS. 17 through 20 can be employed.

Also, the digital signature to be recorded in the file generated by the content code file generating means 902 includes only the digital signature of the control center (KIC), or the digital signature of the control center and the digital signature of the production or presentation entity of content codes included in each file.

The information recording medium 910 thus generated by the information recording medium manufacturing device records various types of data described with reference to FIG. 1 and others. Specifically, the information recording medium stores at least a content file which stored content codes, and a content code file which stores content codes including a program or application information to be applied to usage of content, and further includes data for tampering verification.

The data for tampering verification included in the content code file is the digital signature or hash value based on the data including the content codes included in the content code file. Also, the content code file may include multiple content code files which store the content codes to be sectioned into multiple different categories, as previously described with reference to FIG. 15.

Also, the content code file to be recorded in the information recording medium may include multiple content code files storing content codes which are sectioned into multiple different categories, and arrangement is made wherein of the multiple recording files, only one file is set as a content code file including digital signature data, or all of the files include a digital signature, as previously described with reference to FIGS. 18 and 20.

Also, as previously described with reference to FIGS. 19 and 20, an arrangement may be made wherein the content code file includes the digital signature of the production or presentation entity of content codes included in each file.

The present invention has been described in detail so far with reference to specific embodiments. However, it is self-evident that one skilled in the art can make modifications and substitutions to the embodiments without departing from the essence of the present invention. That is to say, the present invention has been disclosed in exemplary form, and should not be interpreted restrictively. The judgment of the essence of the present invention should be made with reference to the Claims section.

Note that the series of processing described in the Specification can be carried out by hardware, software, or a combination of both. In the case of executing the processing with software, a program recording the processing sequence can either be installed in the memory within a computer that has built-in dedicated hardware and executed, or the program can be installed in a general-purpose computer capable of executing various types of processing.

For example, the program may be recorded in a hard disk or ROM (Read Only Memory) serving as recording media. Or, this may be temporarily or permanently stored (recorded) in removable media such as a flexible disk, CD-ROM (Compact Disc Read Only Memory), MO (Magneto optical) disk, DVD (Digital Versatile Disc), magnetic disk, semiconductor memory, etc. Such removable recording media can be provided as so-called packaged software.

Note that besides installing the program from removable recording media such as described above to the computer, the program may be wirelessly transferred to the computer from the download site, or transferred to the computer over networks such as a LAN (Local Area Network) or the Internet, with a computer receiving the program transferred in such a way, so as to be installed in a built-in recording medium such as a hard disk or the like.

Also, the various types of processing described in the Specification are not restricted to execution in the time-sequence described, and may be executed in parallel or independently, depending on the processing capabilities of the device executing the processing. Also note that the term "system" as used in the present Specification refers to a logical collection of multiple devices, and is not restricted to the devices of each configuration being within a single housing.

What is claimed is:

1. An information processing device for executing reproduction processing of content recorded in an information recording medium, said device comprising:
a data processing unit for acquiring content codes including a program or application information to be applied to the recording content of the information recording medium, and executing data processing in accordance with the acquired content codes;
wherein said data processing unit is configured so as to execute verification processing of a digital signature which allows tampering verification of the entire content codes included in a content code file storing said content codes, and as the verification result, execute data processing in accordance with the content codes on the condition that validity of the content code file has been confirmed,
wherein said data processing unit is configured so as to execute data processing which becomes necessary along with replacement processing of some data of content to which a fix-up table included in said content codes is applied.

2. The information processing device according to claim 1, wherein said data processing unit is configured so as to execute verification processing of a digital signature provided by a control center, as a verification processing of said digital signature, and further, to execute verification processing of a digital signature signed with a secret key unique to a player manufacturer and thus provided.

3. The information processing device according to claim 1, wherein said data processing unit is configured so as to execute signature verification processing regarding each content code file to be used which is selected from multiple content code files recorded in an information recording medium based on the digital signature set in each file.

4. The information processing device according to claim 1, wherein said data processing unit is configured so as to execute signature verification processing based on the digital signature set in one content code file, of the content code files to be used which are selected from multiple content code files recorded in an information recording medium, and execute verification processing other than the digital signature verification regarding the other content code files to be used.

5. The information processing device according to claim 4, wherein said data processing unit is configured so as to execute verification processing based on a hash value regarding said other content code files to be used.

6. The information processing device according to claim 1, wherein said data processing unit is configured so as to execute processing for calculating a parameter to be applied to restoring of a fix-up entry included in said fix-up table, serving as a parameter differing for each segment which is set as a sectioned region of the content recorded in an information recording medium.

7. An information recording medium manufacturing device comprising:
content file generating means for generating a content file which stores content data to be recorded in an information recording medium;
content code file generating means for storing content codes including a program or application information to be applied for content use, and further generating a content code file including data for tampering verification of the entire content codes included in the content code file storing said content codes which have included therein a fix-up table which is applied to content which is subject to replacement processing of some data and data processing; and
recording means for recording the content file generated by said content file generating means, and the content code file generated by said content code file generating means in an information recording medium.

8. The information recording medium manufacturing device according to claim 7, wherein said data for tampering verification is a digital signature based on data including the content codes included in said content code file.

9. The information recording medium manufacturing device according to claim 7, wherein said data for tampering verification is a hash value based on data including the content codes included in said content code file.

10. The information recording medium manufacturing device according to claim 7, wherein said content code file generating means are configured so as to execute processing for generating multiple content code files storing content codes which are sectioned into multiple different categories;
and wherein said recording means are configured so as to execute processing for recording the content code file having multiple different categories which are generated by said content code file generating means in an information recording medium.

11. The information recording medium manufacturing device according to claim 10, wherein said content code file generating means are configured so as to generate multiple content code files storing content codes which are sectioned into multiple different categories, and execute processing for generating only one file, of the generated files, as a content code file including digital signature data.

12. The information recording medium manufacturing device according to claim 7, wherein said content code file generating means are configured so as to generate multiple content code files storing content codes which are sectioned into multiple different categories;
and wherein said content code file generating means are configured so as to execute processing for generating each content code file as a file including a digital signature of a producer or presentation entity of content codes included in each file.

13. A non-transitory computer readable information recording medium comprising, as storage data:
a content file which stores content data; and
a content code file for storing content codes including a program or application information to be applied for content use, and further including data for tampering verification of the entire content codes included in the content code file storing said content codes which have included therein a fix-up table which is applied to content which is subject to replacement processing of some data and data processing.

14. The non-transitory computer readable information recording medium according to claim 13, wherein said content code file is a file wherein a code unique to a player that has been signed using a secret key of a player manufacturer, is further signed by a control center.

15. The non-transitory computer readable information recording medium according to claim 13, wherein said data for tampering verification is a digital signature based on data including the content codes included in said content code file.

16. The non-transitory computer readable information recording medium according to claim 13, wherein said data for tampering verification is a hash value based on data including the content codes included in said content code file.

17. The non-transitory computer readable information recording medium according to claim 13, wherein said content code file comprises multiple content code files storing content codes which are sectioned into multiple different categories.

18. The non-transitory computer readable information recording medium according to claim 17, wherein said content code file comprises multiple content code files storing content codes which are sectioned into multiple different categories, and of the files, only one file is a content code file including digital signature data.

19. The non-transitory computer readable information recording medium according to claim 13, wherein said content code file comprises multiple content code files storing content codes which are sectioned into multiple different categories, and each content code file is configured so as to include a digital signature of a producer or presentation entity of content codes included in each file.

20. An information processing method for executing reproduction processing of content recorded in an information recording medium, said method comprising the steps of:
verification processing serving as a verification step of a digital signature which is set in a content code file storing content codes including a program or application information to be applied for use of recording content of an information recording medium, for executing verification processing of a digital signature which enables tampering verification of the entire content codes included in the content code file; and
code executing for executing data processing in accordance with the content codes, on the condition that validity of the content code file has been confirmed as the verification result of said content codes,
wherein said code executing is a step for executing data processing which becomes necessary along with replacement processing of some data of content to which a fix-up table included in said content codes is applied.

21. The information processing method according to claim 20, wherein said verification processing is a step for executing signature verification processing regarding each content code file to be used which is selected from multiple content code files recorded in an information recording medium based on the digital signature set in each file.

22. The information processing method according to claim 20, wherein said verification processing is a step for executing signature verification processing based on the digital signature set in one content code file, of the content code files to be used which are selected from multiple content code files recorded in an information recording medium, and executing verification processing other than the digital signature verification regarding the other content code files to be used.

23. The information processing method according to claim 22, wherein said verification processing is a step for executing verification processing based on a hash value regarding said other content code files to be used.

24. The information processing method according to claim 20, wherein said code executing is a step for executing processing for calculating a parameter to be applied to restoring of a fix-up entry included in said fix-up table, serving as a parameter differing for each segment which is set as a sectioned region of the content recorded in an information recording medium.

25. An information recording medium manufacturing method comprising the steps of:
content file generating for generating a content file which stores content data to be recorded in an information recording medium;
content code file generating for storing content codes including a program or application information to be applied for content use, and further generating a content code file including data for tampering verification of the entire content codes included in the content code file storing said content codes which have included therein a fix-up table which is applied to content which is subject to replacement processing of some data and data processing; and
recording for recording the content file generated in said content file generating, and the content code file generated in said content code file generating in an information recording medium.

26. The information recording medium manufacturing method according to claim 25, wherein said data for tampering verification is a digital signature based on data including the content codes included in said content code file.

27. The information recording medium manufacturing method according to claim 25, wherein said data for tampering verification is a hash value based on data including the content codes included in said content code file.

28. The information recording medium manufacturing method according to claim 25, wherein said content code file generating is a step for executing processing for generating multiple content code files storing content codes which are sectioned into multiple different categories;

and wherein said recording is a step for executing processing for recording the content code file having multiple different categories which are generated in said content code file generating in an information recording medium.

29. The information recording medium manufacturing method according to claim 28, wherein said content code file generating generates multiple content code files storing content codes which are sectioned into multiple different categories, and executes processing for generating only one file, of the generated files, as a content code file including digital signature data.

30. The information recording medium manufacturing method according to claim 25, wherein said content code file generating is a step for generating multiple content code files storing content codes which are sectioned into multiple different categories;

and wherein said content code file generating is a step for executing processing for generating each content code file as a file including a digital signature of a producer or presentation entity of content codes included in each file.

31. A non-transitory computer readable storage medium having stored thereon a computer program for causing an information processing device to execute reproduction processing of content recorded in the non-transitory computer readable storage medium, said program comprising the steps of:

verification processing serving as a verification step of a digital signature which is set in a content code file storing content codes including a program or application information to be applied for use of recording content of an information recording medium, for executing verification processing of a digital signature which enables tampering verification of the entire content codes included in the content code file; and code executing for executing data processing in accordance with the content codes, on the condition that validity of the content code file has been confirmed as the verification result of said content codes, wherein said code executing is a step for executing data processing which becomes necessary along with replacement processing of some data of content to which a fix-up table included in said content codes is applied.

32. An information recording medium manufacturing device comprising:

a content file generating unit for generating a content file which stores content data to be recorded in an information recording medium;

a content code file generating unit for storing content codes including a program or application information to be applied for content use, and further generating a content code file including data for tampering verification of the entire content codes included in the content code file storing said content codes which have included therein a fix-up table which is applied to content which is subject to replacement processing of some data and data processing; and a recording unit for recording the content file generated by said content file generating unit, and the content code file generated by said content code file generating unit in an information recording medium.

* * * * *